(12) United States Patent
Yamashita et al.

(10) Patent No.: US 12,007,239 B2
(45) Date of Patent: Jun. 11, 2024

(54) INFORMATION PROCESSING APPARATUS, INFORMATION PROCESSING METHOD, COMPUTER PROGRAM, AND TRAVEL MANAGEMENT SYSTEM

(71) Applicant: KABUSHIKI KAISHA TOSHIBA, Tokyo (JP)

(72) Inventors: Michio Yamashita, Tokyo (JP); Noriyuki Hirayama, Tokyo (JP); Yoshikazu Yamane, Tokyo (JP); Hideyuki Aisu, Kanagawa (JP); Shizu Sakakibara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 109 days.

(21) Appl. No.: 17/193,362

(22) Filed: Mar. 5, 2021

(65) Prior Publication Data

US 2022/0082392 A1     Mar. 17, 2022

(30) Foreign Application Priority Data

Sep. 14, 2020    (JP) ................................ 2020-154003

(51) Int. Cl.
*G01C 21/34*      (2006.01)
*G01C 21/36*      (2006.01)

(52) U.S. Cl.
CPC ....... *G01C 21/343* (2013.01); *G01C 21/3461* (2013.01); *G01C 21/3605* (2013.01); *G01C 21/3667* (2013.01)

(58) Field of Classification Search
CPC .............. G01C 21/343; G01C 21/3461; G01C 21/3605; G01C 21/3667
See application file for complete search history.

(56) References Cited

U.S. PATENT DOCUMENTS 4,887,013 A    12/1989   Doth
5,283,739 A *   2/1994   Summerville ....... G05D 1/0289
                                           700/255

(Continued)

FOREIGN PATENT DOCUMENTS

CA       3060540 A1 *   4/2020   ............. G01C 21/20
CN    107566981 A   *   1/2018

(Continued)

OTHER PUBLICATIONS

CN_107566981_A_I_machine_translation (Year: 2018).*
Machine Translation of CN 107566981 (Year: 2018).*

*Primary Examiner* — Anne Marie Antonucci
*Assistant Examiner* — Patrick M Brady
(74) *Attorney, Agent, or Firm* — Finnegan, Henderson, Farabow, Garrett & Dunner, LLP

(57) ABSTRACT

An information processing apparatus for a travel network including travel paths and reference regions coupling the paths includes a first scheduler configured to generate a first schedule including (1) a sequence of representative regions allowing a first mobile object to pass through the representative regions, and (2) timings of passage through the representative regions, based on move command information for the first mobile object to travel to a first reference region; and a second scheduler selecting a first representative region from among the representative regions included in the first schedule according to a travel situation of the first mobile object, and generate a second schedule including (1) a first route allowing the first mobile object to travel in a first area including the first representative region, and (2) timings for the first mobile object to pass through the reference regions included in the first route.

17 Claims, 21 Drawing Sheets

(56) References Cited

U.S. PATENT DOCUMENTS

| | | | |
|---|---|---|---|
| 11,199,840 B2 | 12/2021 | Morita et al. | |
| 2015/0046081 A1* | 2/2015 | Brand | G01C 21/362 |
| | | | 701/430 |
| 2016/0373892 A1* | 12/2016 | Gotoh | H04W 4/024 |
| 2018/0374354 A1* | 12/2018 | Akiyama | G08G 1/0133 |
| 2019/0170521 A1* | 6/2019 | Elhoushi | G01C 21/20 |
| 2020/0012284 A1* | 1/2020 | Morita | G05D 1/0016 |
| 2020/0293063 A1 | 9/2020 | Aisu | |
| 2021/0123766 A1 | 4/2021 | Yamashita et al. | |
| 2021/0125493 A1 | 4/2021 | Yamashita et al. | |
| 2022/0019217 A1 | 1/2022 | Yamane et al. | |

FOREIGN PATENT DOCUMENTS

| | | |
|---|---|---|
| JP | H2-244207 A | 9/1990 |
| JP | 2000-181539 A | 6/2000 |
| JP | 2000-339012 A | 12/2000 |
| JP | 2020-149370 A | 9/2017 |
| JP | 2020-8962 A | 1/2020 |
| JP | 2021-71795 A | 5/2021 |
| JP | 2021-71796 A | 5/2021 |
| JP | 2022-18855 A | 1/2022 |

\* cited by examiner

| MOBILE OBJECT | POSITION |
|---|---|
| agv1 | Nc1 |
| agv2 | Nc2 |

FIG. 4A

| TASK | OPERATION COMMAND |
|---|---|
| task1 | Na2→Nl2 |
| task2 | Nd1→Ng1 |

FIG. 4B

| MOBILE OBJECT | POSITION |
|---|---|
| agv1 | Sa1 |
| agv2 | Sa2 |

FIG. 6A

| TASK | OPERATION COMMAND |
|---|---|
| task1 | Sa1→Sd1 |
| task2 | Sb1→Sc1 |

GLOBAL OPERATION SCHEDULE

| TASK | MOBILE OBJECT | GLOBAL NODE | TIME (ARRIVAL) | REMARKS |
|---|---|---|---|---|
| task1 | agv1 | Sa1 | 100 | Na2 LOADING |
|  |  | Sa0 | 200 |  |
|  |  | Sb0 | 300 |  |
|  |  | Sc0 | 400 |  |
|  |  | Sd0 | 500 |  |
|  |  | Sd1 | 600 | Nl2 UNLOADING |
|  |  | Sd0 | 700 |  |
|  |  | Sc0 | 800 |  |
|  |  | Sb0 | 900 |  |
|  |  | Sa0 | 1000 |  |
|  |  | Sa1 | 1100 | Nc1 HOME |
| task2 | agv2 | Sa0 | 300 |  |
|  |  | Sb0 | 400 |  |
|  |  | Sb1 | 500 | Nd1 LOADING |
|  |  | Sb0 | 1000 |  |
|  |  | Sc0 | 1100 |  |
|  |  | Sc1 | 1200 | Ng1 UNLOADING |
|  |  | Sc0 | 1300 |  |
|  |  | Sb0 | 1400 |  |
|  |  | Sa0 | 1500 |  |
|  |  | Sa2 | 1600 | Nc2 HOME |

FIG. 8

LOCAL OPERATION SCHEDULE OF AREA B

| TASK | MOBILE OBJECT | NODE | TIME (ARRIVAL) | REMARKS |
|---|---|---|---|---|
| task1 | agv1 | ...<br>Sa0<br>Ne0<br>Sc0<br>...<br>Sc0<br>Ne0<br>Sa0<br>... | ...<br>200<br>300<br>400<br>...<br>800<br>900<br>1000<br>... | |
| task2 | agv2 | Sa0<br>Ne0<br>Ne1<br>Nd1<br>Ne1<br>Ne0<br>Sc0<br>...<br>Sc0<br>Ne0<br>Sa0<br>... | 300<br>400<br>410<br>500<br>510<br>1000<br>1100<br>...<br>1300<br>1400<br>1500<br>... | Nd1 LOADING |

FIG. 9

LOCAL OPERATION SCHEDULE OF AREA B

| TASK NAME | MOBILE OBJECT | NODE | TIME (ARRIVAL) | REMARKS |
|---|---|---|---|---|
| task1 | agv1 | ... | ... | |
| | | Sa0 | 200 | |
| | | Ne0 | 300 | |
| | | Sc0 | 400 | |
| task2 | agv2 | ... | ... | |
| | | Sc0 | 800 | |
| | | Ne0 | 900 | |
| | | Sa0 | 1000 | |
| | | ... | ... | |
| task3 | agv2 | Sa0 | 300 | |
| | | Ne0 | 400 | |
| | | Ne1 | 410 | |
| | | Ne2 | 420 | |
| | | Ne3 | 430 | |
| | | Nd3 | 440 | Nd3 LOADING |
| | | Ne3 | 450 | |
| | | Nf3 | 460 | Nf3 UNLOADING |
| | | Ne3 | 470 | |
| | | Ne2 | 480 | |
| | | Ne1 | 490 | |
| | | Nd1 | 500 | Nd1 LOADING |
| | | Ne1 | 510 | |
| | | Ne0 | 1000 | |
| | | Sc0 | 1100 | |
| | | ... | ... | |
| | | Sc0 | 1300 | |
| | | Ne0 | 1400 | |
| | | Sa0 | 1500 | |
| | | ... | ... | |

ADD OPERATION COMMAND

| TASK NAME | OPERATION COMMAND |
|---|---|
| task3 | Nd3→Nf3 |

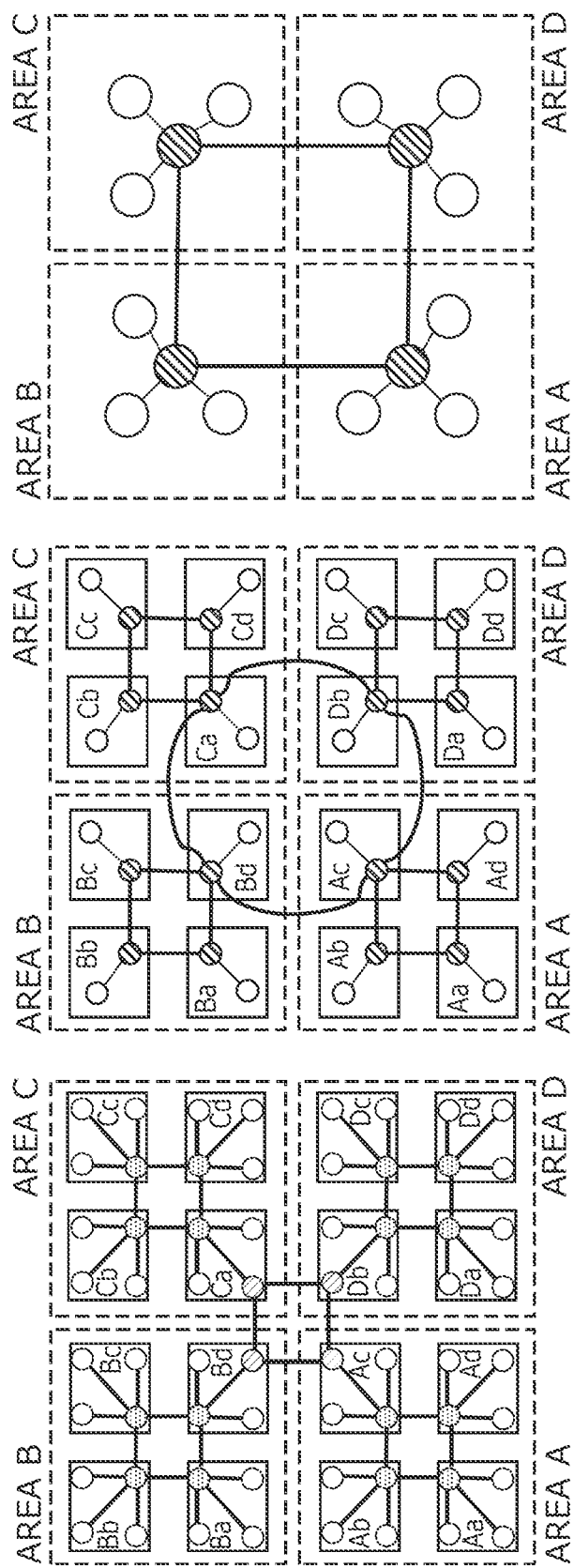

ENTIRE FLIGHT NETWORK

GLOBAL FLIGHT NETWORK

| MOBILE OBJECT | POSITION |
|---|---|
| agv1 | Nc1 |
| agv2 | Nc2 |
| agv3 | Nc3 |

| TASK NAME | OPERATION COMMAND |
|---|---|
| task1 | Na1→Nl1 |
| task2 | Na2→Nl2 |
| task3 | Na3→Nl3 |

FIG.19A

| MOBILE OBJECT | POSITION |
|---|---|
| agv1 | Sa1 |
| agv2 | Sa2 |
| agv3 | Sa3 |

| TASK NAME | OPERATION COMMAND |
|---|---|
| task1 | Sa1→Sd1 |
| task2 | Sa2→Sd2 |
| task3 | Sa3→Sd3 |

FIG.19B

INFORMATION PROCESSING APPARATUS, INFORMATION PROCESSING METHOD, COMPUTER PROGRAM, AND TRAVEL MANAGEMENT SYSTEM

CROSS REFERENCE TO RELATED APPLICATIONS

This application is based upon and claims the benefit of priority from the prior Japanese Patent Application No. 2020-154003, filed on Sep. 14, 2020, the entire contents of which are incorporated herein by reference.

FIELD

Embodiments described herein relate to an information processing apparatus, an information processing method, a computer program, and a travel management system.

BACKGROUND

Techniques of creating an operation schedule of mobile objects at a low calculation cost include a technique that calculates a series of subgoals from sparse lattice points, and calculates a route between the subgoals from dense lattice points. This technique can reduce the calculation amount for generating the operation schedule, in comparison with a method of reconstructing the entire operation schedule at one time.

Unfortunately, this technique is required to reconstruct the entire operation schedule when a schedule is added or changed. For creation of the operation schedule, the congestion situation (overcrowded state) of the mobile objects is intended to be controlled in some cases. However, this technique cannot perform such control.

BRIEF DESCRIPTION OF THE DRAWINGS

FIGS. 4A and 4B show an example of mobile object information, and an example of operation command information;

FIGS. 6A and 6B show an example of positional information and operation command information in the global travel network;

FIG. 7 shows an example of a global operation schedule;

FIG. 8 shows an example of a local operation schedule;

FIG. 9 shows an example where a task (operation command) is added to the operation command information;

FIGS. 17A to 17C show three-stage travel networks according to the present embodiment;

FIGS. 19A and 19B show examples of positional information and operation command information according to a sixth embodiment;

DETAILED DESCRIPTION

According to one embodiment, there is provided an information processing apparatus for a travel network including a plurality of travel paths and a plurality of reference regions coupling the plurality of paths, a representative region of the reference regions in each of areas into which the travel network is divided being coupled to a representative region of the reference regions in other area of the areas via the travel path.

The information processing apparatus includes a first scheduler configured to generate a first schedule including (1) a sequence of representative regions allowing a first mobile object to pass through the representative regions, and (2) timings of passage through the representative regions, based on move command information for the first mobile object to travel to a first reference region.

The information processing apparatus includes a second scheduler configured to select a first representative region from among the representative regions included in the first schedule according to a travel situation of the first mobile object, and generate a second schedule including (1) a first route allowing the first mobile object to travel in a first area including the first representative region, and (2) timings for the first mobile object to pass through the reference regions included in the first route.

Below, the embodiments of the present invention will be described with reference to the accompanying drawings.

First Embodiment

Figure 1:
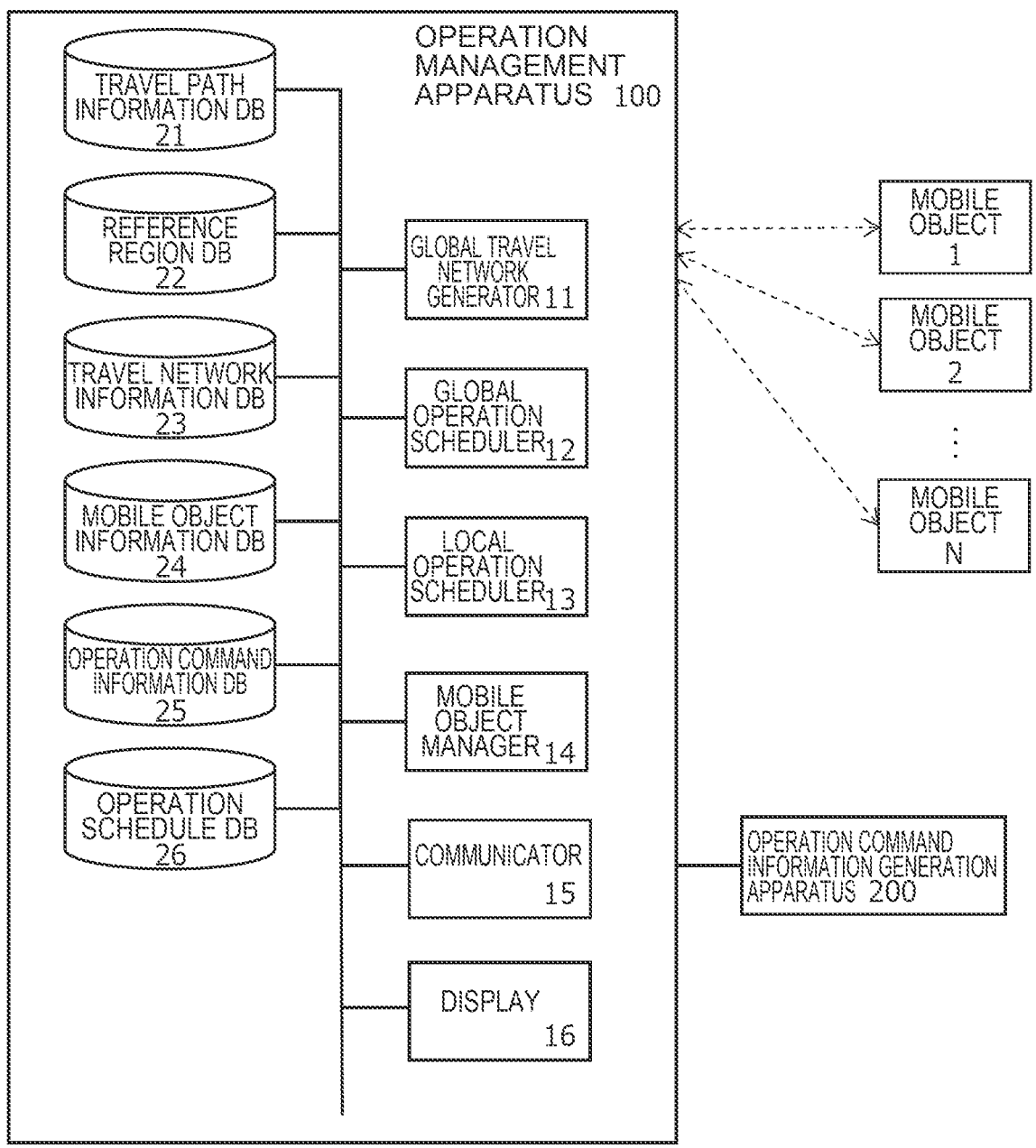
FIG. 1 is a block diagram of an operation management apparatus according to a first embodiment.

FIG. 1 shows a block diagram of a travel control system that includes an operation management apparatus 100 according to a first embodiment, a plurality of mobile objects 1 to N, and an operation command information generation apparatus 200 (task generation apparatus). The operation management apparatus 100 includes a global travel network generator 11 (first virtual travel network generator), a global operation scheduler 12 (first scheduler), a local operation scheduler 13 (second scheduler), a mobile object manager 14, a communicator 15, a display 16, a travel path information database (DB) 21, a reference region DB 22, a travel network information DB 23, a mobile object information DB 24, an operation command information DB 25, and an operation schedule DB 26. The operation management apparatus 100 is connected to the operation command information generation apparatus 200 in a wired or wireless manner.

The operation management apparatus 100 creates operation schedules (a global operation schedules, and a local operation schedule) that are schedules for efficiently controlling operations of the plurality of mobile objects 1 to N that autonomously travel in a travel area, such as a free plane, for example. The operations of the mobile objects include travel of mobile objects, and work, such as of loading and unloading loads. During creation of the operation schedule, contention, such as a collision or a deadlock, is prevented to occur among the mobile objects. The plurality of mobile objects 1 to N are autonomously movable mobile objects, such as AGVs, autonomous mobile robots, autonomous vehicles (e.g., self-driving cars), or drones.

The plurality of mobile objects 1 to N travel, for example, in a factory, a storehouse, or facility premises. The plurality of mobile objects 1 to N, for example, carry rechargeable batteries, and carry out motions, such as travel or loading and unloading of loads.

The entire travel network is a network that includes a plurality of areas serving as references (reference regions), and a plurality of travel paths that connect the reference regions to each other. The reference region is an intersection of travel paths, an end of a travel path or the like. At a part of or in proximity to the reference region there are arranged a gate at which a mobile object receives a load (conveyance object), and shelves on or from which loads are loaded or unloaded. The mobile object can carry out work in the reference region, and load and unload. Loading and unloading are carried out by the mobile object, or can be carried out by an operator attending by the mobile object in some cases. The travel paths may have the shape of a straight line, a curved line, or a combination thereof. The travel path is a path on which the mobile object can move.

When the entire travel network is represented by a two-dimensional space that is an X-Y plane, reference regions are identified by X-Y coordinates. Alternatively, each reference region may be identified by a group of a plurality of X-Y coordinates. For example, when the reference region is rectangular, the reference regions may be identified by groups of X-Y coordinates of vertices. When the entire travel network is represented by a X-Y-Z space (three-dimensional space) considering the height, reference regions are identified by X-Y-Z coordinates. Alternatively, each reference region may be identified by a group of a plurality of the X-Y-Z coordinates of each vertex.

The travel network information DB 23 stores structure information about the entire travel network, as graph data. The entire travel network is managed as graph data that includes nodes corresponding to the reference regions, and links corresponding to the travel paths. The nodes are coupled by links. The reference region and the nodes are managed in a manner associated with map data on the entire travel network. The link is managed by a group of the positions of nodes at the opposite ends of the link. The map data may be defined in advance in the form of CAD (Computer-Aided Design) drawings or other drawings. Alternatively, if the mobile objects have a function to create environmental maps using a self-position detection function, an environmental map may be created using this function.

Figure 2:
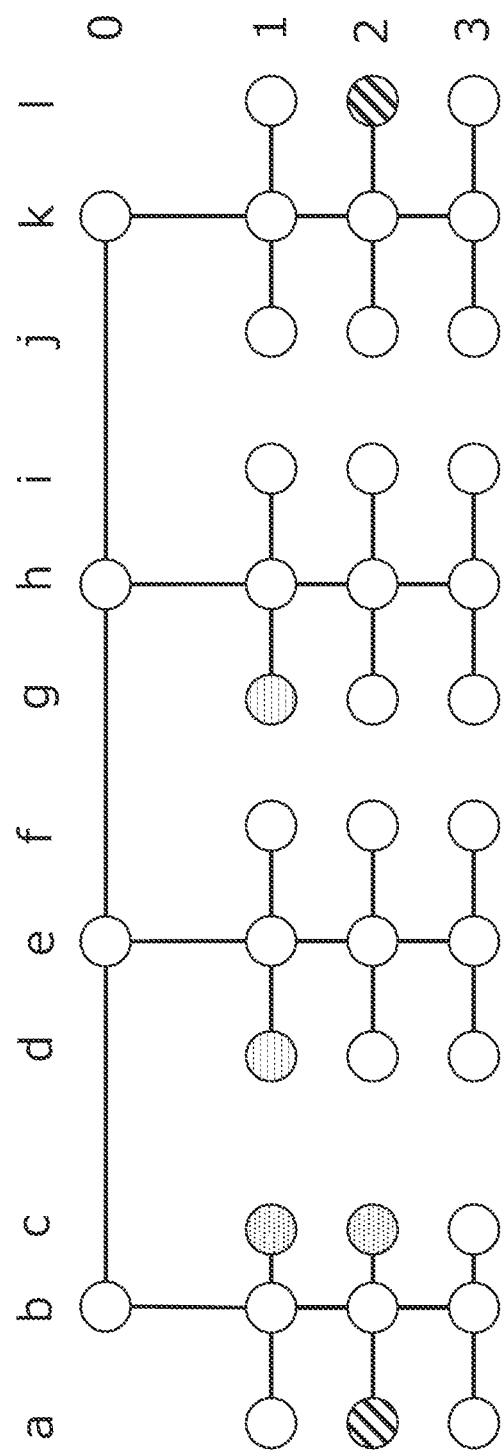
FIG. 2 shows an example of a graph structure of an entire travel network.

FIG. 2 shows an example of a graph structure of the entire travel network. Circles indicate nodes. Lines between circles indicate links. Alphabetical addresses "a" to "l" are set in the horizontal direction. Numerical addresses "0" to "3" are set in the vertical direction. The node is identified by a group of an address in the horizontal direction and an address in the vertical direction. The node ID (node name) is represented by a group of a fixed value N+a lateral address+a vertical address. For example, the node IDs of two dot-patterned circles are "Nc1" and "Nc2". The link is assigned an ID by any method. The link can be identified by a group of the node names at the opposite ends.

In the entire travel network, a plurality of areas that do not overlap with each other are set. That is, the entire travel network is divided into a plurality of areas.

Figure 3:
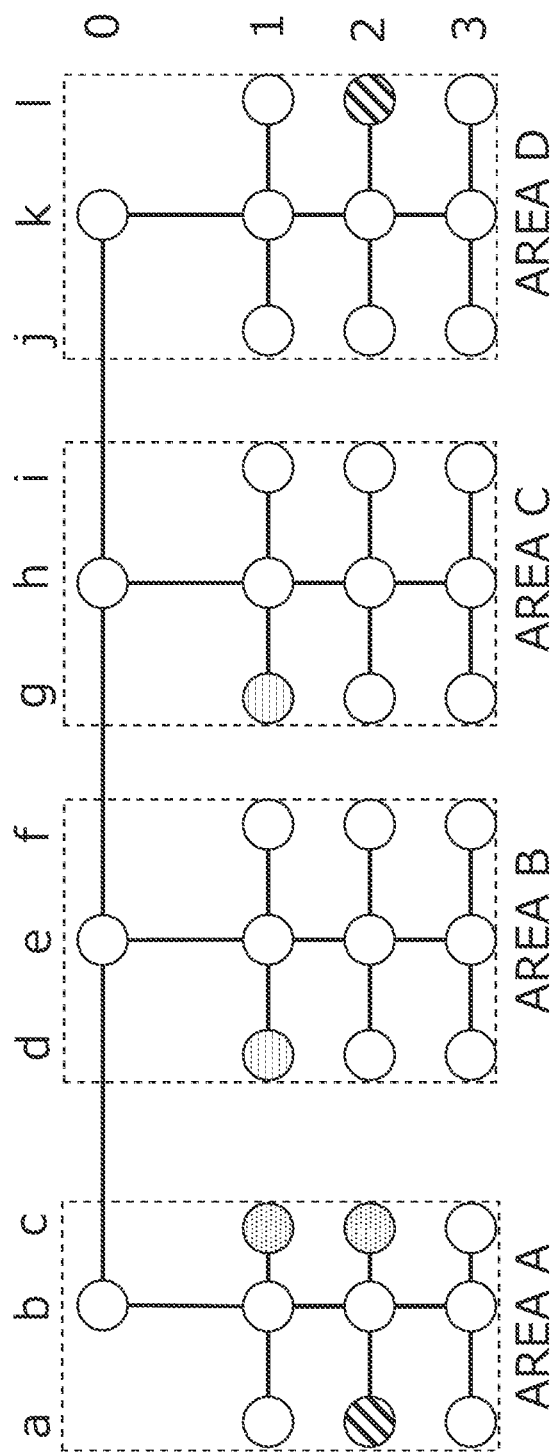
FIG. 3 shows an example where four areas are set in the entire travel network in FIG. 2.

FIG. 3 shows an example where four areas (areas A to D) are set in the entire travel network in FIG. 2. The area A including nodes having horizontal-direction addresses "a" to "c", the area B including nodes having horizontal-direction addresses "d" to "f", the area C including nodes having horizontal-direction addresses "g" to "i", and the area D including nodes having horizontal-direction addresses "j" to "l", are set. Setting of area division may be determined by an operation management administrator, and be input into the operation management apparatus 100 using an input device, not shown. Links and nodes may be regarded as branches and leaves, respectively. Area division may be carried out by a mechanism using the graph theory or the like. The area setting information is stored in the travel network information DB 23.

Note that the mobile objects may be capable of moving forward, backward, or both forward and backward. The mobile objects may be rotatable and thus capable of making forward/backward direction changes. Also, the mobile objects may be capable of moving in directions such as oblique directions other than forward/backward directions.

Sensors configured to detect states of mobile objects, communication devices configured to communicate with the mobile objects or both of them may be placed in reference regions, travel paths, shelves, gates, or any other locations. In that case, the sensors are connected to at least either of the operation management apparatus 100 and communication devices by wire or radio.

Under the control of the operation management apparatus 100 shown in FIG. 1, each mobile object is caused to travel (move) in the entire travel network according to the specified operation command information. For example, the mobile object carries a load received from a gate to another gate. There are cases in which the work of unloading or loading loads from/onto a shelf is carried out in the process of moving. Each mobile object receives move command data generated by the operation management apparatus 100 based on operation command information and positional information about the mobile object, and executes instructions contained in the move command data. Note that there can be cases in which the mobile object only moves without conveying loads.

The present embodiment assumes that only one mobile object can enter one node (reference region). It is also assumed that a mobile object cannot overtake another mobile object on one link (travel path), or veer at the middle of the link and return. The travel path may include one lane, or two or more lanes. Note that the assumptions described here is only one example. All or some of these constraints are not necessarily present.

The travel path information DB 21 stores, as travel path information, information about the links corresponding to the travel paths in the entire travel network. The travel path information includes link IDs (travel path IDs), and IDs of nodes at the opposite ends of the links (i.e., IDs of the reference regions at the opposite ends of the travel paths).

The reference region DB 22 stores information about the nodes corresponding to the reference regions in the entire travel network. The information about the nodes includes, for example, the node IDs, and X coordinates and Y coordinates. The reference region DB 22 stores information (ID) about a representative region that is a reference region representing each area among reference regions (nodes) included in this area in the entire travel network. The representative region of each area is coupled to the representative regions of other areas via travel paths. In an example in FIG. 3, reference regions corresponding to nodes "Nb0", "Ne0", "Nh0" and "Nk0" are the respective representative regions of the areas A to D.

The mobile object information DB 24 stores information about one or more mobile objects. For example, this DB stores the IDs of and positional information about the mobile objects. The positional information about the mobile objects includes, for example, real-time positional information (the latest positional information), and history information about positions through which the mobile objects have passed so far. For example, data including the positional information may be received from the mobile object/bodies every predetermined time, and the position information about the mobile object/bodies from the received data. Alternatively, data for notification of passage of mobile objects detected by the sensors may be received from a communication device connected to the sensors provided in the entire travel network. As positional information about mobile objects, positional information (home position) about mobile objects on standby assigned no operation command information yet may be received. In that case, a standby position of the mobile object may be learned by receiving data containing the positional information about the mobile object from the communication device connected to the sensor installed on the mobile object on standby or in a waiting place. The communicator 15 communicates with the mobile objects wirelessly or wiredly. The communication scheme may be any of a wireless LAN (Local Area Network), mobile communication, dedicated communication standards or the like, and is not specifically limited.

Examples of possible information other than IDs and positional information include remaining power in the battery carried by the mobile object, information as to whether the mobile object carries a load (when the mobile object is intended to convey loads), and the type and number of loads being conveyed. Examples of information specific to the mobile object include specification information about the mobile object including the standard speed, maximum speed, minimum speed, size of the mobile object, and movable direction. If the mobile object is intended to convey loads, possible examples of information also include the working time required for loading/unloading (e.g., the time required to load or unload a predetermined number of loads). The information cited here is only exemplary, and other information may be used.

FIG. 4A shows an example of mobile object information. The positions of two mobile objects (agv1, agv2) are indicated. Here, "agv1" is present at a node "Nc1", which is a home position, and "agv2" is present at a node "Nc2", which is a home position. In FIGS. 2 and 3 described above, the nodes "Nc1" and "Nc2" correspond to the dot-patterned nodes. Presence of "agv1" at the node "Nc1" means presence of "agv1" in a reference region corresponding to the node "Nc1".

The operation command information DB 25 stores operation command information (task information) representing operation commands (tasks) to be assigned to one or more mobile objects. The operation command information is generated by the operation command information generation apparatus 200, and is received by the operation management apparatus 100. The operation command information is assigned to the mobile objects by the global operation scheduler 12 described later.

The operation command information generation apparatus 200 includes, for example, an input interface for operating the operation management apparatus 100, and accepts an operation command information generation instruction from a user, who is an operator, through an input interface. The operation command information generation instruction includes, for example, an operation start point, a target point, details of work to be carried out at the start point, and details of work to be carried out at the target point. When the mobile object only moves from the start point to the target point, the details of work are not required. For example, the operation command information generation apparatus 200 generates operation command information that issues an instruction of loading at the start point, moving to the target point, and unloading at the target point, based on the operation command information generation instruction input from the user. The operation command information generation apparatus 200 transmits the generated operation command information to the operation management apparatus 100.

The operation management apparatus 100 associates the operation command information received from the operation command information generation apparatus 200 with information (state information) indicating an execution state of the operation command information, and stores the information in the operation command information DB 25. The operation command information includes, for example, information about the start point and the target point, and further includes information about work to be carried out at the start point and the target point. If the work to be carried out at the points between the start point and the target point is present, the information includes information about the points, and the information about the work to be carried out at the points. Besides the method of obtaining the operation command information from the operation command information generation apparatus 200, this information may be input by the user using the input device, or be obtained through wired or wireless communication from an external apparatus other than the operation command information generation apparatus 200.

FIG. 4B shows an example of operation command information. Two examples of operation commands are shown. A first operation command (task1) issues an instruction of loading at a node "Na2" that is a work start point, moving to a node "Nl2" that is a target point, and unloading at the node "Nl2". If no mobile object is initially present at the node "Na2", which is the start point, (for example, a mobile object is present at a home position, which is separately defined), the mobile object is required to move to the node "Na2". A second operation command (task2) issues an instruction of loading at a node "Nd1" that is a work start point, moving to a node "Ng1" that is a target point, and unloading at the node "Ng1". It may be predefined that the mobile object having completed execution of the operation command returns to the home position. The home position (departure point) may be the same as the work start point, or another point.

The operation schedule DB 26 stores a global operation schedule generated by a global operation scheduler 12, described later, and a local operation schedule generated by a local operation scheduler 13, described later, from the global operation schedule. As described later, for an area serving as a target, the local operation schedule includes the sequence of nodes (reference regions) passed by the mobile object, node arrival times, and work to be carried out at the nodes. The sequence of the nodes passed by the mobile object corresponds to a route on which the mobile object is to travel (move). Passage of the mobile object includes not only a case where the mobile object arrives at a node and departs from the node, but also a case where the mobile object departs from a node (reference region) or a case where the mobile object arrives a node (reference region). The global operation schedule includes, for example, a first schedule that defines the sequence of representative regions through which the mobile object is allowed to pass, and timing of passage through the representative regions. The local operation schedule includes, for example, a second schedule that defines a route (first route) of travel in an area (first area) including each representative region defined by the first schedule, and timings of passage through the reference regions included in the route. Note that if passage is not through reference regions other than the representative region in the area, the second schedule only includes timing of passage through the representative region.

The mobile object manager 14 is a travel controller that controls travel of the mobile objects, based on the local operation schedule for the mobile objects in the operation schedule DB 26. Specifically, the mobile object manager 14 generates move command data that instructs the mobile object to arrive in the sequence of the nodes (reference regions) defined by the local operation schedule at times defined by the local operation schedule. If there is work to be carried out by the mobile object at a node, an instruction of the work to be carried out at the node is also added to the move command data. The mobile object manager 14 transmits the move command data to the mobile object via the communicator 15. By executing the move command data, the mobile object sequentially moves through the nodes, and carries out designated work, at the node where work is to be carried out. In further detail, the mobile object manager 14 is as follows.

The mobile object manager 14 sequentially generates an instruction (move instruction) to move to the point (node) defined by the local operation schedule. The move instruction may include a time of arrival at the node. If work to be carried out at the node is present, an instruction (work execution instruction) to execute the work at the node may be included Examples of the work include receiving a load from a gate, carrying the received load to a shelf, and loading the load onto the shelf. Unloading the load from the shelf is also included.

The mobile object manager 14 arranges generated instructions (move instructions and work execution instructions) in the sequence of the reference regions passed by the mobile object, thereby generating move command data on the mobile object.

The mobile object manager 14 transmits the generated move command data to the mobile object via the communicator 15. Subsequently, the mobile object manager 14 communicates with the mobile object through the communicator 15, thereby managing the situation of the mobile object to which the move command data has been transmitted. For example, this manager manages which instruction the mobile object executes, and which position the mobile object is present at (which node or link the mobile object is present). Also for the mobile object assigned no operation command information yet, the mobile object manager 14 may manage the situation of the mobile object by communicating through the communicator 15.

Upon receiving a notification of completion of execution of all move command data items according to the operation command information from the mobile object, the mobile object manager 14 may remove the operation command information whose execution has been completed, from the operation command information DB 25, or set an execution completion flag in the operation command information. Every time the local operation schedule is generated or updated for the mobile object, the mobile object manager 14 generates the move command data, and transmits the generated move command data to the mobile object.

The display 16 displays various pieces of information through a user interface screen, based on information stored in the DBs 21 to 26, data generated by the components 11 to 13, and information collected from the mobile object. Users of the operation management apparatus 100, such as an administrator, an observer, and an operator, can confirm the operation situation and the like of the mobile objects, based on the details displayed on the display 16. Details are described in a seventh embodiment.

(Global Travel Network Generator 11)

The global travel network generator 11 generates a global travel network, based on the graph structure of the entire travel network (travel network). The representative region in each plurality of areas in the entire travel network is adopted as a representative node. The representative nodes are coupled to each other through the links (first links). One or more lower nodes are coupled to each representative node through one or more links (second links). A global travel network, which is a first virtual travel network, is thus generated. The mobile object moves on the links, while regarding it as virtual travel paths, in the first virtual travel network, and can pass through the node (including arrival and departure). If a plurality of representative regions are present in the area in the entire travel network, a plurality of representative nodes may be set in the area in the global travel network. The present embodiment indicates a case of setting one representative node in one area.

The lower nodes coupled to the representative node represent a constraint on the number of mobile objects allowed to be present in an area represented by the representative node (entry into the lower nodes of the representative node is permitted). Specifically, the number of lower nodes functions as the number of mobile objects allowed to enter the area of the representative node. That is, the number of lower nodes provides a constraint condition of the area. The constraint condition (the number of lower nodes) is stored in the operation schedule DB 26 or another freely selected DB or storage. The condition may be input from the user, such as the operator of the operation management apparatus 100, through the input device, and be dynamically changed. The number of lower nodes may be determined by the operation management administrator, or mechanically determined according to the operation situation of the mobile objects.

Figure 5:
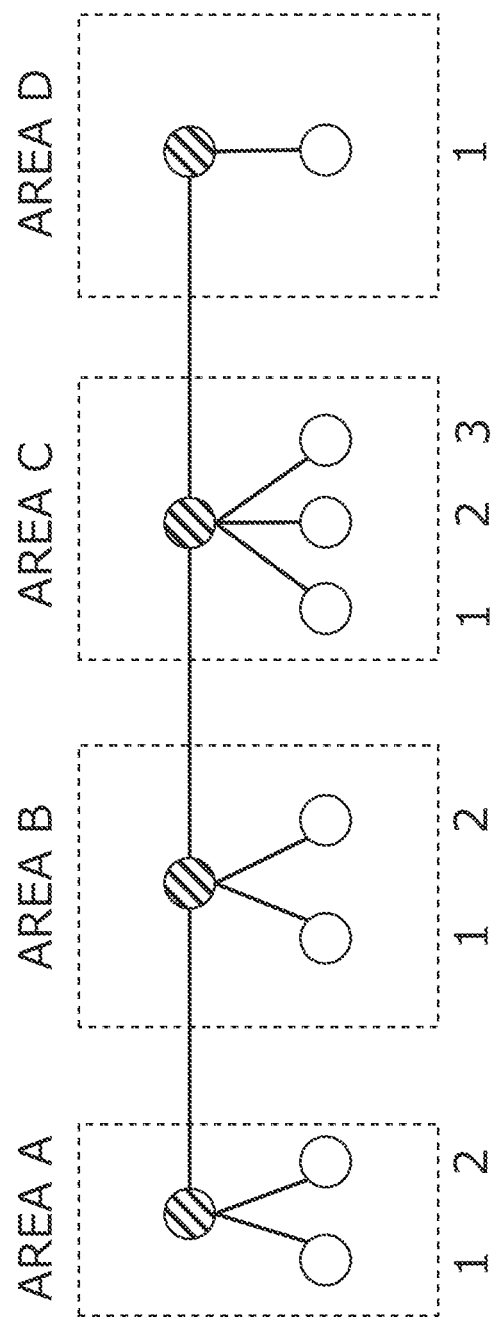
FIG. 5 shows an example of a global travel network.

FIG. 5 shows an example of the global travel network generated from the entire travel network in FIG. 3. The areas A to D are provided with the respective representative nodes. The representative nodes are respectively indicated by circles with oblique lines. The areas A to D respectively correspond to the areas A to D set in the entire travel network in FIG. 3. Hereinafter, the areas A to D may indicate any of the areas A to D in the entire travel network and the global travel network. The representative nodes are respectively indicated by circles with oblique lines. The areas A and B are each provided with two lower nodes. The area C is provided with three lower nodes. The area D is provided with one lower node. The lower nodes are respectively indicated by outlined circles. As described above, the number of lower nodes functions as a constraint condition for the number of mobile objects allowed to enter the area (movable from the representative node to the lower node).

The ID of the lower node (lower node name) is represented by a group of a fixed value "S"+area name+horizontal-direction address (address), for example. For example, the lower left node in the area A is "Sa1". The representative node is represented by the fixed value "S"+area name+fixed value ("0" in this example). For example, the representative node of the area A is "Sa0". The lower nodes concerned are coupled to the representative node in the area identical to that of the lower nodes through links (second links). Between adjacent areas, the representative nodes are coupled to each other through links (first links). The representative node "Sa0" of the area A is coupled to the representative node "Sb0" of the area B. The representative node "Sb0" of the area B is coupled to the representative node "Sa0" of the area A and to the representative node "Sc0" of the area C. The representative node "Sc0" of the area C is coupled to the representative node "Sb0" of the area B and to the representative node "Sd0" of the area D. The representative node "Sd0" of the area D is coupled to the representative node "Sc0" of the area C. Coupling between the representative nodes can be determined from the coupling relationship between the representative regions in the entire travel network. In comparison with the entire travel network, the global travel network can be represented by a simple graph structure. The larger the scale of the entire travel network is, the more effects are increased.

The global operation scheduler 12 detects unassigned pieces of operation command information among the pieces of operation command information stored in the operation command information DB 25. The detected operation command information is assigned to the mobile objects. Based on the constraint condition of the area (the number of lower nodes in the area in this example), the global operation schedule of the mobile objects is generated. The global operation schedule includes travel between the representative nodes, and travel between the representative nodes and the lower nodes. The global operation schedule is a schedule that defines a route (second route) for travel in the global travel network, and timings of travel between the plurality of nodes (the representative nodes and the lower nodes) included in the second route.

As a specific example, it is assumed that the two mobile objects "agv1" and "agv2" shown in FIG. 4A are assigned the respective operation commands ("task 1" and "task 2") in the operation command information shown in FIG. 4B. The "agv1" and "agv2" are initially present at the home positions. The home positions of "agv1" and "agv2" are the respective nodes "Nc1" and Nc2 indicated by the mobile object information in FIG. 4A. As described above, "task1" corresponds to an operation command of loading at the node "Na2" and unloading at the node "Nl2", and "task2" corresponds to an operation command loading at the node "Nd1" and unloading at the node "Ng1". Loading and unloading commands are not explicitly indicated. However, in the present embodiment, the operation command between two points implicitly includes loading at a start point and unloading at an arrival point.

The "task1" (operation command) corresponds to one example of move command information for "agv1" from "Na2" to "Nl2" (first reference region). The "task2" (operation command) corresponds to one example of move command information for "agv2" from "Nd1" to "Ng1" (first reference region). According to both "task1" and "task2", the home positions of the mobile object are different from work start positions. Consequently, "agv1" and "agv2" are required to travel from the home positions to the work start positions. The "task1" thus includes move command information from the home position "Nc1" to the work start position "Na2" (first reference region). The task2 includes move command information from the home position "Nc1" to the work start position "Nd1" (first reference region).

The global operation scheduler 12 generates the positional information (the lower node or the representative node) about the mobile object in the global travel network, and the operation command information (global operation command information), based on the positional information about the mobile object in the entire travel network and the operation command information assigned to the mobile object.

The mobile object present at a node (home position) in an area in the entire travel network can be assigned to any lower node in the same area in the global travel network. That is, the position of the mobile object present at a node in an area in the entire travel network can be converted into the position of any lower node in the same area in the global travel network. Note that only one mobile object can be present at (assigned to) one lower node. Consequently, if another mobile object has already been assigned to the lower node (if present without departure from the lower node), this lower node cannot be assigned the mobile object. That is, it is required to assign the mobile object to a lower node having been assigned no mobile object. Consequently, the global operation scheduler 12 is required to assign the operation command information to the mobile object so as not to exceed the number of lower nodes. If there are mobile objects that are to be assigned and are larger in number than the lower nodes, assignment of the operation command information is required to wait until lower nodes are vacated. This prevents the mobile objects larger in number than the lower nodes from being present in the area in the global travel network at the same time.

Likewise, also for the node at the start point and the node at the target point, the mobile object is assigned to a lower node in the area identical to that in the entire travel network. For example, as for the target point of the mobile object, the mobile object is assigned to any lower node in the area identical to that of the target point in the entire travel network.

FIGS. 6A and 6B show an example of the positional information about mobile objects and the operation command information in the global travel network. The "agv1" present at the node "Na2" that is the home position in the entire travel network is assigned to the lower node "Sa1" in the global travel network. The "agv2" present at the node "Nd2" that is the home position in the entire travel network is assigned to the lower node "Sa2" in the global travel network. That is, the position of "agv1" is converted into the position of the lower node "Sa1", and the position of "agv2" is converted into the position of the lower node "Sa2". Likewise, also for the operation command, the start point "Na2" indicated by "task1" is converted into "Sa1", and the target point "Nl2" is converted into "Sd1". The start point "Nd1" indicated by "task2" is converted into "Sb1", and the target point "Ng1" is converted into "Sc1". Note that the home position of "agv1" and the start position (loading position) of "agv1" are the same "Sa1" in the global travel network.

The global operation scheduler 12 generates the global operation schedule of the mobile objects, based on the positional information about the mobile objects in the global travel network and the operation command information. The route (the global route or the second route) from the lower node corresponding to the home position in the global travel network to the lower node at the target point is calculated. At this time, timing (arrival time) of passage of the mobile object through the lower node or the representative node is calculated so as to satisfy the constraint condition in the area in the global travel network. For example, timing (arrival time) of passage of the mobile object through the lower node or the representative node is calculated such that mobile objects whose number exceeds the number of lower nodes cannot be present in the area at the same time. Accordingly, control is made such that mobile objects whose number exceeds the number of lower nodes cannot be present at the same time in the area. Besides, if there is a constraint of prohibiting travels, such as overtaking of another mobile object on the link, or veering and returning on the link, this constraint is required to be satisfied. The method of generating the global operation schedule is not specifically limited to a specific one.

For example, a route where no deadlock or the like occurs and timing thereof may be determined by searching for all the travel patterns of the mobile objects through simulation. At this time, a standard speed may be used as the travel speed of the mobile object. The standard speed may be defined in conformity with the characteristics of the mobile object, the characteristics of the travel path (e.g., the material of the travel path etc.), the gradient of the travel path. A condition of a possibility of occurrence of a deadlock or the like may be defined, and travel patterns that do not satisfy the condition may be retrieved. Alternatively, the route of each mobile object may be determined, and after the route is determined, the arrival time at each node may be determined so as not to cause a deadlock or the like between the mobile objects. The route may be a route of minimizing the travel distance or the travel time from the departure point (the home position or the work start point) to the target point. At this time, the distance from the lower node to the representative node may be the distance from the reference region where the mobile object is present to the representative region in the entire travel network (the minimum distance, the average distance or the like). Likewise, the distance between representative nodes may be the distance between the respectively corresponding representative regions in the entire travel network.

The global operation scheduler 12 thus generates the global operation schedule that includes the passing sequence of the nodes (lower nodes and representative nodes) in the global travel network, and the arrival times at the nodes. The global operation schedule may include information about work to be carried out at the nodes (lower nodes or representative nodes). In the entire or a part of the global operation schedule, particularly, in the global operation schedule, a schedule component that includes the sequence of passage through the representative nodes and timings of passage through the representative nodes corresponds to a first schedule that includes the sequence of passage through the representative regions in the entire travel network and timings of passage through the representative regions.

FIG. 7 shows an example of the global operation schedule generated based on the mobile object information in the global travel network shown in FIG. 6 and the global operation command information.

The "task1" is assigned to the "agv1". First, "agv1" travels toward "Sa1", and loads at "Sa1". At the departure time, "agv1" is present at "Sa1". Accordingly, the moving of travel to "Sa1" seems not to be required. However, the home position of "agv1" and the work start position are the same as each other in the global travel network, but are different from each other in the entire travel network. Accordingly, as a matter of necessity to represent moving in the area in the global travel network, moving of travel from "Sa1" to "Sa1" is required. The "agv1" is the arrival time of travel to "Sa1" (or the time of passage through "Sa1") and is "100". Hereinafter, arrival at "Sa1" at time "100" is described as "Sa1 (100)". This representation also applies to arrival at other nodes. The "agv1" loads at "Sa1", subsequently travels in a sequence of "Sa0 (200)", "Sb0 (300)", "Sc0 (400)", "Sd0 (500)" and "Sd1 (600)", and unloads at "Sd1". After unloading, travel in a sequence of "Sd0(700)", "Sc0(800)", "Sb0(900)", "Sa0(1000)" and "Sa1(1100)", thereby allowing agv1 to return to the home position "Nc1".

The "task2" is assigned to "agv2". The arrival time of "agv2" at "Sa0" is "300". This means that "agv1" passes through "Sa0", and subsequently "agv2" passes through "Sa0". Consequently, "agv2" waits until "agv1" passes through "Sa0", then moves to "Sa0 (300)", "Sb0 (400)" and "Sb1 (500)", and unloads at "Sb1". Next, "agv2" travels toward "Sb0". The arrival time at "Sb0" is "1000". That is, it means that "agv1" unloads a load at the area D and subsequently travels toward the area A, and "agv2" waits until "agv1" passes, and then travels toward "Sb0". The "agv2" travels in a sequence of "Sb0 (1000)", "Sc0 (1100)" and "Sc1 (1200)", and unloads at "Sc1". Then, travel in a sequence of "Sc0 (1300)", "Sb0 (1400)", "Sa0 (1500)" and "Sa2 (1600)" allows "agv2" to return to the home position "Nc2".

The global operation scheduler 12 obtains information, such as about the position of the mobile object, from the mobile object manager 14, and virtually moves the mobile objects in the global travel network according to the global operation schedule. In case the global operation schedule cannot be followed owing to delay of the mobile object, the global operation schedule in the operation schedule DB 26 can be changed. In this case, as required, the local operation schedule described later is also changed.

The local operation scheduler 13 selects the representative node from the global operation schedule according to travel situations of the mobile objects in the global travel network or the entire travel network, and generates the local operation schedule for the area including the representative node. The local operation schedule corresponds to an example of the second schedule that defines the route (first route) on which the mobile objects travel in the area concerned in the entire travel network, and timings of passage through the reference regions (nodes) included in the route. Note that with respect to the selected representative node, for the area where the node (lower node) other than the representative node is not passed, the local operation schedule that adopts the arrival time of the representative node in the global operation schedule as the arrival time of the representative region may be generated. That is, the local operation schedule that defines that arrival at the representative region is at the arrival time may be generated. The local operation schedule is a schedule of an origin of generation of the move command data to be transmitted to the mobile object.

FIG. 8 shows an example of the local operation schedule in the area B generated based on the global operation schedule in FIG. 7. A case is assumed where in conformity with the global operation schedule, "agv1" arrives at "Sa0" at time "200", and at this timing (timing of entry into the area B), the local operation schedule about the area B is generated. That is, a case is assumed where the representative node of the area B is selected in the global operation schedule, and the local operation schedule that defines a route (first route) on which the mobile objects travel in the area B, and timings of passage through the reference regions (nodes) included in the route is generated. In the global operation schedule about the area B, "task1" has "Sb0 (300)" and "Sb0 (900)", and "task2" has "Sb0 (400)", "Sb1 (500)", "Sb0 (1000)" and "Sb0 (1400)". Note that for the area A, the local operation schedule is generated before departure from the home position, and "agv1" is caused to travel according to the local operation schedule, thereby allowing "agv1" to arrive at "Sa0" at time "200". That is, in the global operation schedule, the representative node of the area A is selected before departure, and the local operation schedule that defines the route for travel of "agv1" (to this representative node) in the area A, and timings of passage through the reference regions (nodes) included in the route is generated. The move command data for executing the local operation schedule is transmitted to "agv1", and "agv1" executes the move command data, thereby allowing arrival at "Sa0" at time "200".

"Sb0" in the global travel network corresponds to "Ne0" in the entire travel network. Accordingly, "Sb0" is replaced with "Ne0" as such. In "task1", "Sb0 (300)" and "Sb0 (900)" are replaced with "Ne0 (300)" and "Ne0 (900)", respectively.

According to "task2", "Sb0 (400)", "Sb0 (1000)" and "Sb0 (1400)" are replaced with "Ne0 (400)", "Ne0 (1000)" and "Ne0 (1400)", respectively. "Sb1 (500)" in "task2" represents loading at "Nd1" according to the operation command information in the entire travel network in FIG. 4B. According to the entire travel network, travel to "Sb1 (500)" corresponds to travel to "Ne1 (X1)" and "Nd1 (X2)". Subsequently, passage through "Ne1(X3)" and return (travel) to "Ne0(1000)" are required. Accordingly, travel to "Sb0 (400)", "Sb1 (500)" and "Sb0 (1000)" is replaced with travel to Ne0 (400), "Ne1 (X1)", "Nd1 (X2)", "Ne1 (X3)" and "Ne0 (1000)". "X1", "X2" and "X3" are respective arrival times at "Ne1", "Nd1" and "Ne1". "X1", "X2" and "X3" are determined by scheduling travel of "agv2" in the area B in the entire travel network. For example, based on a standard travel speed of "agv2", the arrival times at "Ne1", "Nd1" and "Ne1" may be simulated. A method similar to that for the global operation schedule described above may be adopted. In this case, if the local operation schedule for another mobile object (another "agv") has already been created in the area B, it is desirable not to affect the local operation schedule for the other "agv" (not to change the local operation schedule for the other "agv"). In a case with a constraint condition of prohibiting passage on the travel paths (links), veering on the links and return and the like, the local operation schedule for agv2 is created so as to satisfy the constraint condition. In the example in FIG. 8, "Ne1 (X1)", "Nd1 (X2)" and "Ne1 (X3)" are determined as "Ne1 (410)", "Nd1 (500)" and "Ne1 (510)", respectively.

In the example described above, the local operation scheduler 13 generates the local operation schedule for the mobile object "agv1" for the area B at timing when agv1 enters the area B. That is, as for timing of entry of "agv1" into the area B, at time 200 of departure from "Sa0" (the arrival time and the departure time are assumed to be the same), the local operation schedule of the area B for "agv1" is generated. The local operation schedule of the area B for "agv2" may be generated at the timing of entry of "agv2" into the area B. Accordingly, at the timing of the mobile object actually approaching the area to be entered, the local operation schedule of this area is generated, which can reduce the possibility of rescheduling. That is, if the time period from generation of the local operation schedule of the area to actual entry into the area becomes long, recreation of the local operation schedule is sometimes required owing to delay of the mobile object, delay of the schedule for the mobile object traveling ahead by a trouble and the like. However, creation of the local operation schedule at the timing of entry into the area can reduce such a possibility. Accordingly, the amount of calculation for generating the local operation schedule can be reduced.

Note that the timing of generating the local operation schedule is not limited to the example described above. Various variations are adopted. For example, at the time of creating the global operation schedule for the mobile objects, the local operation schedule of the area may be subsequently created (before travel is started). For example, for the area including the home position, the local operation schedule is generated after generation of the global operation schedule and before departure from the home position. In another example, the local operation schedule may be generated for areas other than the area including the home position, before departure. For example, if there are no other vehicles at the current time in the area to which the vehicle is to travel, it can be determined that a possible preliminarily generated local operation schedule has a low possibility of being required to be changed. There is, however, a possibility that after the local operation schedule of the area for the mobile object is generated, an operation command of allowing another mobile object to enter the area prior to the mobile object concerned is assigned. In this case, as required, the local operation schedule of the area for the mobile object may be updated (recreated). For example, at the timing of entry of the mobile object into the area, the local operation schedule may be recreated (updated).

More specifically, if the local operation scheduler 13 preliminarily generates the local operation schedule of the area for the mobile object, this scheduler determines whether the local operation schedule is required to be rescheduled or not at the timing of entry into the area. If rescheduling is required, the local operation schedule is regenerated. For example, it is assumed that after the local operation schedule of the area for the mobile object is generated, the local operation schedule of the area for another mobile object is generated. If the local operation schedule of the area for another mobile object is started before the local operation schedule for the mobile object described above, possible execution of the local operation schedule for this mobile object as it is can sometimes cause contention between the mobile objects. For example, it is assumed that the other mobile object cannot carry out work at a scheduled time and delays. The mobile object faces another mobile object on the travel path, and both the mobile objects do not go back, thus causing contention, such as a deadlock. In case such contention occurs, the local operation schedule is required to be changed before the mobile object enters the area (before passage through the representative node of the area).

According to another example of timing of generating the local operation schedule, if the distance to the representative region of the area is equal to or less than a certain value, or if the time period required to arrive at the representative region of the area is equal to or less than a certain value, the local operation schedule of this area may be generated.

The local operation scheduler 13 does not necessarily generate the local operation schedule of the area over the entire scheduling target time period. For example, if there is a time period with no mobile object in the area according to the global operation schedule, the local operation schedule of the area is not required to be generated for this time period. For example, in the example in FIG. 8, from time "1100" to time "1300", no mobile object is present in the area B. In such a case, the local operation schedule of the area B may be generated in a manner divided into a schedule until time "1100" and a schedule after time "1300". The range of thus generated local operation schedule is temporally divided, and the local operation schedule is generated in a required time range, thereby allowing the calculation amount to be reduced.

Addition or change of the operation command is sometimes applied to the operation command information. The mobile object can sometimes delay or cause abnormality. If the effect is limited within the area, only the local operation schedule in the area is required to be updated (regenerated), and the global operation schedule is not required to be updated.

FIG. 9 shows an example where "task3" is added to the operation command information for "agv2". The "task3" is an operation command of loading at "Nd3" and unloading at "Nf3". Since "task3" is carried out in the area B, only the local operation schedule of the area B for the "agv2" is basically required to be reviewed and changed. Accordingly, reduction in calculation amount can be expected. However, if no "agv2" is present in the area B, the global operation scheduler 12 is required to change the global operation schedule for "agv2" so as to move "agv2" into the area. If change of the local operation schedule for "agv2" affects another mobile object, the local operation schedule for the other mobile object is also required to be changed.

Figure 10:
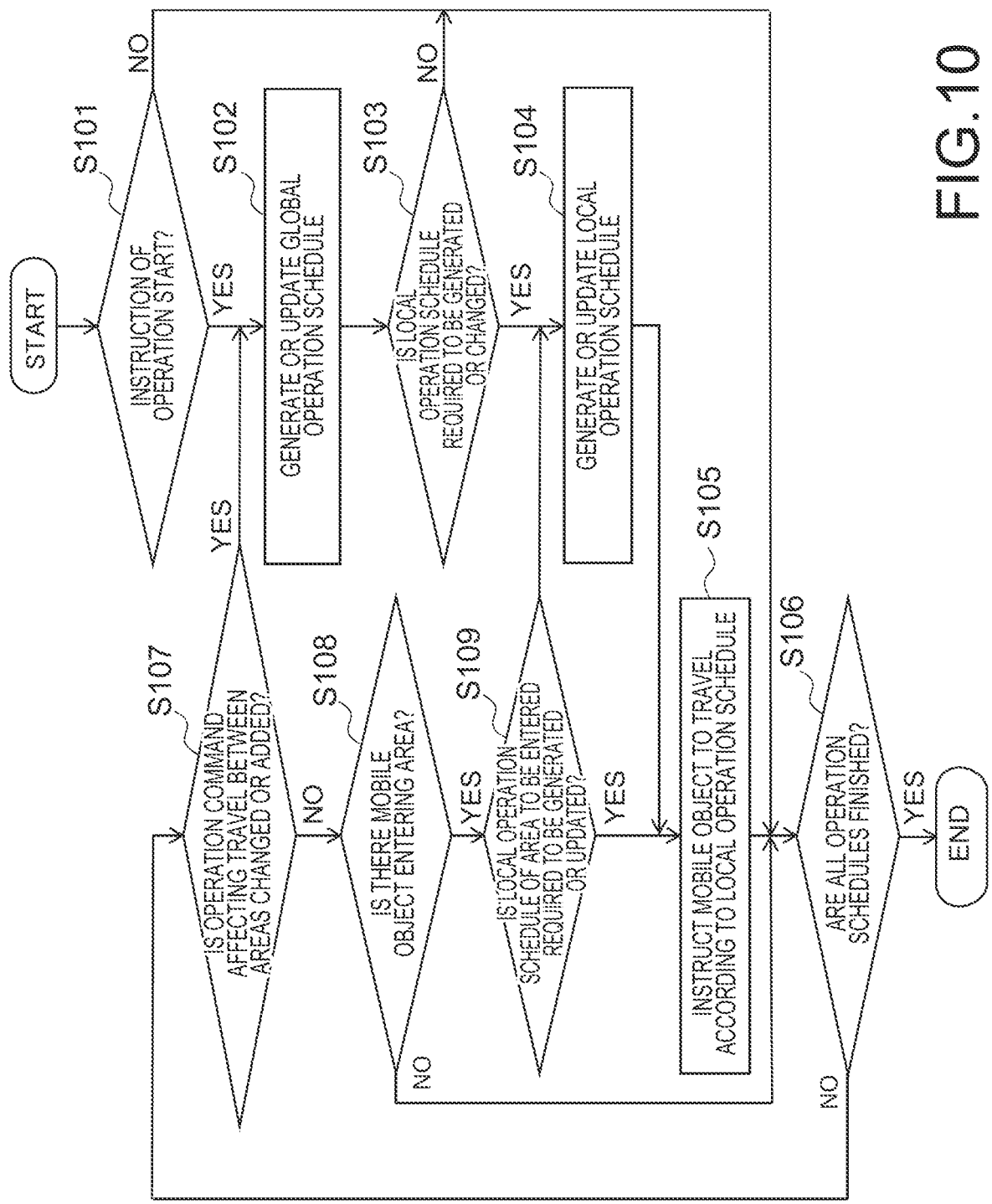
FIG. 10 is a flowchart of an operation example of the operation management apparatus according to the present embodiment.

FIG. 10 is a flowchart of an operation example of the operation management apparatus 100 according to the present embodiment. The global operation scheduler 12 determines whether the unassigned operation command information is present in the operation command information DB 25 (S101). If not present, this scheduler goes to step S106. If the unassigned operation command information is present, this scheduler assigns the operation command information to the mobile object, and generates the global operation schedule for the mobile object (S102).

Figure 11:
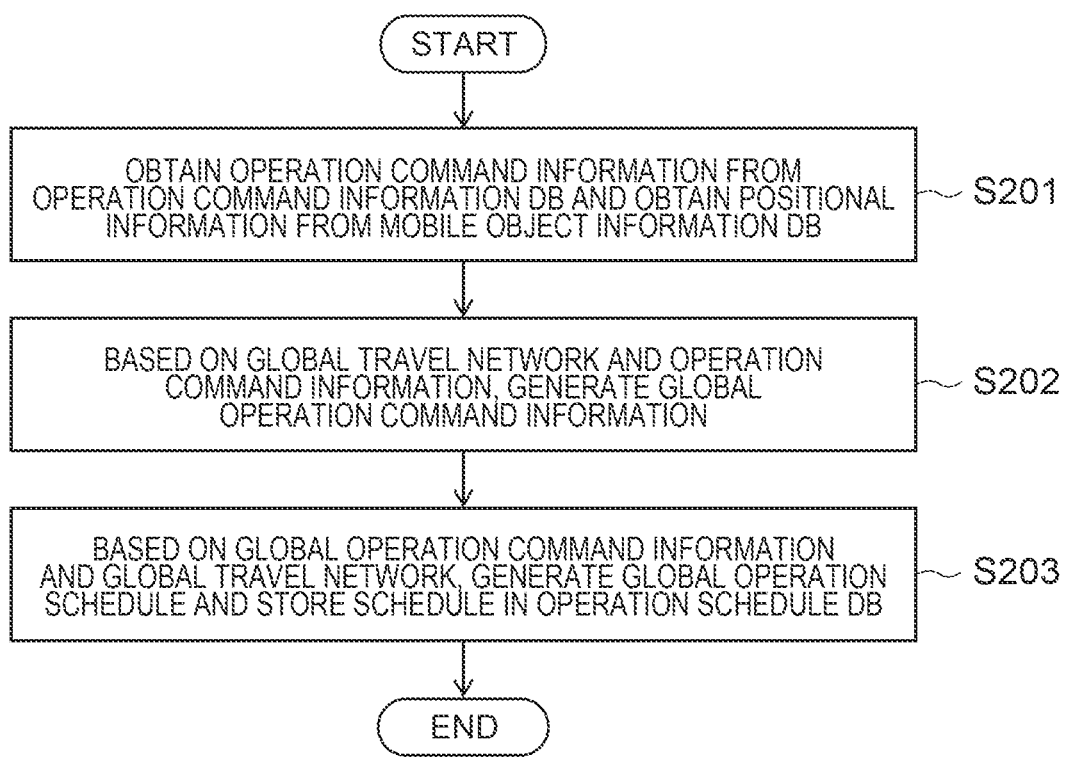
FIG. 11 is a flowchart of an operation example of a global operation scheduler.

FIG. 11 is a flowchart of an operation example of the global operation scheduler 12. The global operation scheduler 12 obtains the operation command information from the operation command information DB 25, and obtains the positional information about the mobile object from the mobile object information DB 24. The obtained operation command information is assigned to the mobile object (S201). Based on the global travel network, the operation command information and the positional information, the global operation command information is generated for the mobile object (S202). Based on the global operation command information and the global travel network, the global operation schedule is generated, the generated global operation schedule is associated with the ID of the mobile object, and is stored in the operation schedule DB 26 (S203).

The local operation scheduler 13 determines whether the local operation schedule is required to be generated or changed (S103). For example, if the operation command information is newly assigned to the mobile object and the global operation schedule is generated in step S101, the local operation schedule is generated for the area where the mobile object is currently positioned. For example, the local operation schedule of travel from the reference region (e.g., the home position) where the mobile object is currently positioned to the representative region of the area including the reference region is generated (S104). The local operation scheduler 13 associates the local operation schedule with the ID of the mobile object and stores them in the operation schedule DB 26.

It is sometimes determined to generate the local operation schedule of the area including the travel start point or the target point of the mobile object. In this case, the local operation schedule of the area is also generated (the same S104). For example, if no other mobile object is present in the area at the current time, it is conceivable that the local operation schedule of the area including the start point or the target point is generated.

Figure 12:
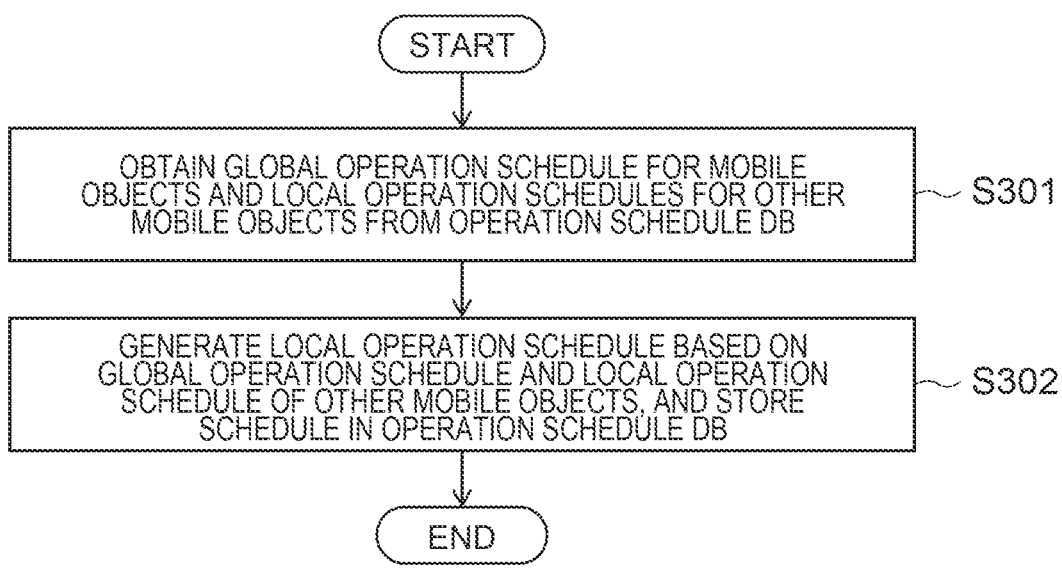
FIG. 12 is a flowchart of an operation example of a local operation scheduler.

FIG. 12 is a flowchart of an operation example of the local operation scheduler 13. The local operation scheduler 13 obtains the global operation schedule for the mobile object concerned, and the local operation schedule for other mobile objects from the operation schedule DB 26 (S301). The global operation schedules of the other mobile objects may be further obtained. If the generated local operation schedule for the mobile object concerned is present, this local operation schedule is obtained. The local operation scheduler 13 generates or changes the local operation schedule for the mobile object concerned based on the obtained operation schedule (S302). This scheduler associates the generated or changed local operation schedule with the ID of the mobile object and stores them in the operation schedule DB 26 (the same S302).

The mobile object manager 14 generates the move command data for the mobile object based on the generated or updated local operation schedule, and transmits the generated move command data to the mobile object via the communicator 15 (S105). It is determined whether the operations of all the mobile objects are finished (S106). If finished, the present process is finished. If not finished, the processing proceeds to step S107.

The global operation scheduler 12 determines whether an operation command affecting the travel between areas is added (S107). For example, there are an operation command of causing travel between new areas, and an operation command according to which the area arrival time is required to be changed. If the operation command is added, the global operation schedule for the mobile object concerned is updated (S102). If the original global operation schedule cannot be followed owing to delay of the mobile object, the operation schedule may also be updated. Subsequently, the processing proceeds to steps S103 and S104.

If no operation command affecting the travel between areas is added, the local operation scheduler 13 determines whether any mobile object entering the area is present (S108). If no mobile object entering the area is present, this scheduler goes to step S105. If there is any mobile object entering the area, this scheduler determines whether the local operation schedule of the area to be entered by the mobile object is required to be generated or updated (S109). If the local operation schedule of the area has not been generated yet, this scheduler determines that the local operation schedule is required to be generated. If the local operation schedule of the area has already been generated but the schedule cannot be followed owing to occurrence of delay or the like of the mobile object after generation, this scheduler determines that update is required. If generation or update is required, this scheduler goes to step S104. If not required, this scheduler goes to step S105. Note that if there is no move command data to be newly transmitted to the mobile object, step S105 may be skipped.

According to the present embodiment, the global operation schedule and the local operation schedule are generated stepwise. Only the global operation schedule is previously generated, and the local operation schedule is generated at a required time point (for example, at the timing of the mobile object entering the area where work is to be carried out), thereby allowing calculation to be temporally distributed. Accordingly, the local operation schedule can be generated in the latest situations in consideration of delay of arrival of the mobile object, delay of work and the like. Consequently, the possibility of rescheduling can be reduced. Therefore, efficient scheduling can be achieved, and the calculation amount can be reduced. Also in this case, if the work of the mobile object is added or changed but the effect is exerted only in the local operation schedule, the global operation schedule is not required to be changed. Consequently, the calculation cost can be reduced.

According to the present embodiment, the number of mobile objects entering the area can be controlled by the number of lower nodes set in the area. Consequently, the operation schedule where the overcrowdedness of the mobile objects in the area is controlled can be generated.

Second Embodiment

In the present embodiment, by dynamically changing the number of lower nodes in the area in the global travel network, the number of mobile objects entering the area in the global travel network is controlled. The number of mobile objects entering the area in the entire travel network is thus controlled.

The number of lower nodes can be dynamically changed at timing of generating the global operation schedule. The number of lower nodes is changed by the global travel network generator 11.

Figure 13:
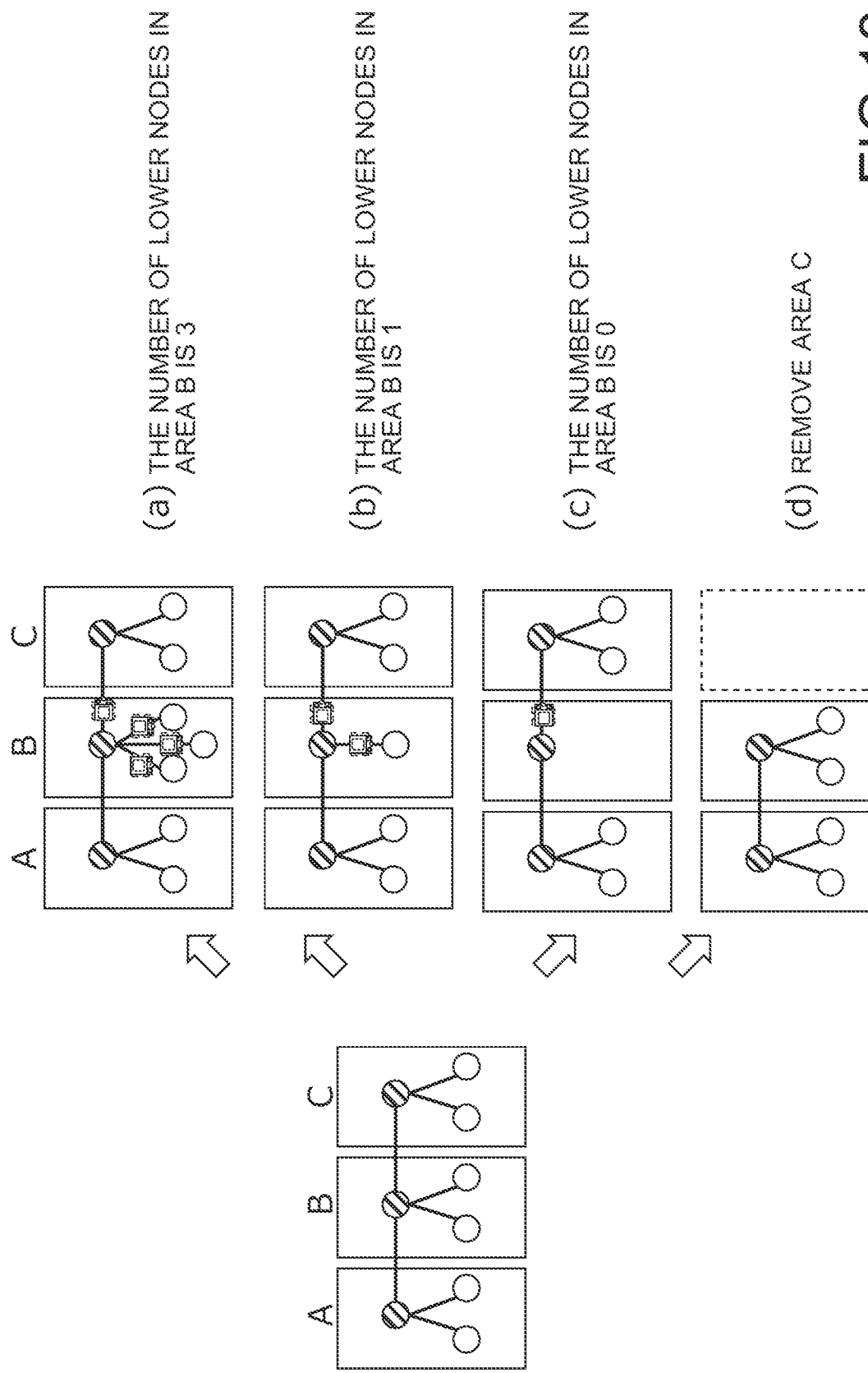
FIG. 13 shows an example of changing the number of lower nodes.

FIG. 13 shows an example of changing the number of lower nodes. The global travel network having not been changed yet is shown on the left side of FIG. 13. The areas A, B and C each include two lower nodes. Four change examples (a), (b), (c) and (d) of the numbers of lower nodes are shown on the right side of the diagram.

At (a) in FIG. 13, the number of lower nodes in the area B is increased to three. Accordingly, a global operation schedule is generated that accommodates three mobile objects toward the lower nodes in the area B (entering the area B) at the maximum. In the example in the diagram, three mobile objects have already entered below the representative node of the area B. Accordingly, a global operation schedule allowing the fourth mobile object to enter the a lower node of the area B (i.e., local operation schedule allowing entry from the representative region of the area B to a reference region other than the representative region of the area B) cannot be created. Note that passage from the representative node or the representative region of the area B to the representative node or the representative region of another area is allowed.

At (b) in FIG. 13, the number of lower nodes in the area B is reduced to one. Accordingly, a global operation schedule accommodating one mobile object toward a lower node of the area B at the maximum (a local operation schedule accommodating one mobile object entering the area B at the maximum) is generated. In the example in the diagram, one mobile object has entered the area B. Accordingly, second mobile object and later is not allowed to enter the area B.

At (c) in FIG. 13, the number of lower nodes in the area B is reduced to zero. In this case, the mobile object is only allowed to pass through the representative node or the representative region of the area B.

At (d) in FIG. 13, not only the lower nodes but also the representative node in the area C is removed. That is, the area C itself is removed. Accordingly, the global operation schedule and the local operation schedule for travel to the area C cannot be generated.

Similar to (c) and (d) in FIG. 13, in a specific example of making the number of lower nodes zero or removing an area, for example, there is a case of using all the areas during daytime and preventing the mobile objects from traveling to certain areas during night-time.

As described above, by controlling the number of lower nodes in the area of the global travel network or presence or absence of usage of the area, the overcrowdedness in the area is controlled to a desired state. For example, a reduction in the number of lower nodes reduces the number of mobile objects entering the area. An increase in the number of lower nodes increases the number of mobile objects entering the area. Consequently, for example, an operation schedule can be generated that controls the overcrowdedness of the mobile objects in the area such that as the area A is crowded, the number of mobile objects entering the area A is reduced.

Third Embodiment

In the present embodiment, an example with a plurality of representative nodes is indicated.

Figure 14:
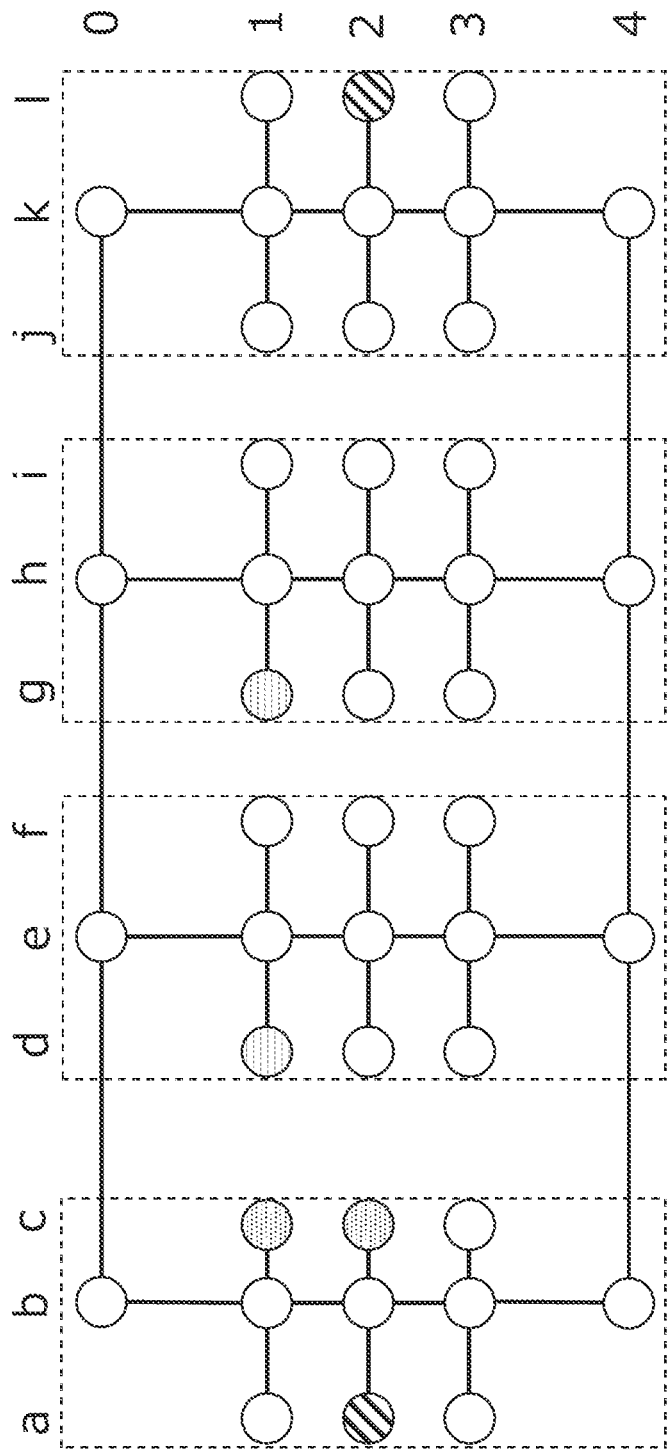
FIG. 14 shows an example of the entire travel network according to a third embodiment.

FIG. 14 shows an example of the entire travel network according to a third embodiment.

Figure 15:
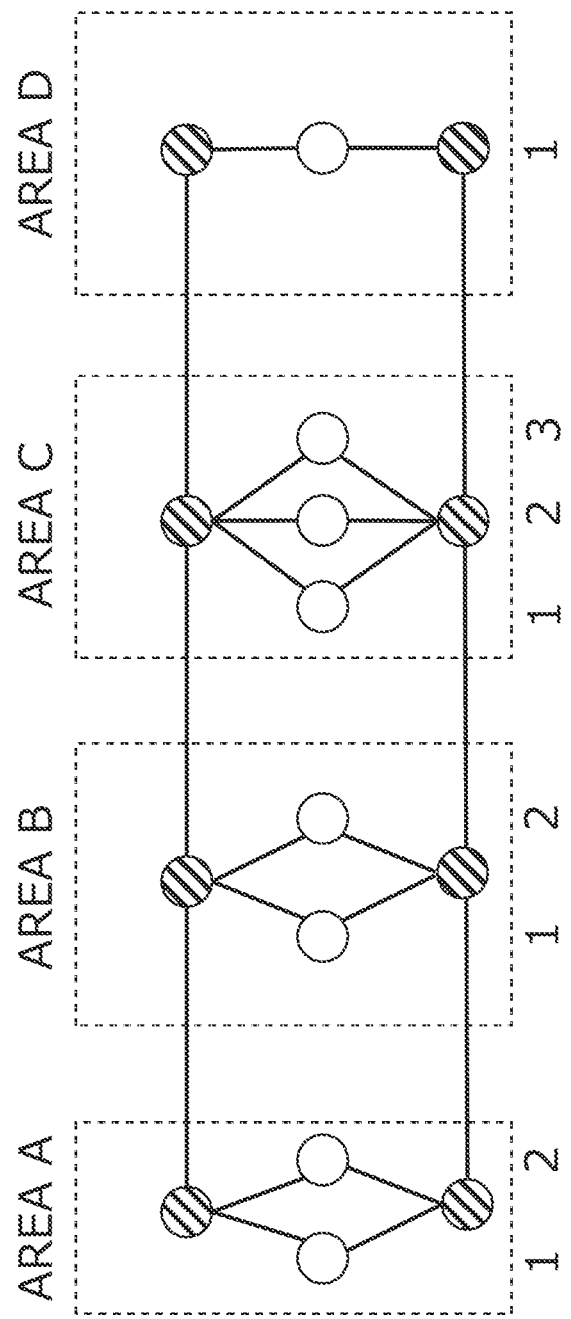
FIG. 15 shows an example of the global travel network according to the third embodiment.

FIG. 15 shows an example of the global travel network according to the third embodiment.

As shown in FIG. 14, each area includes a plurality of (two in this example) representative regions (nodes) connected to another area. In conformity therewith, in the global travel network shown in FIG. 15, each area is provided with two representative nodes. The two representative nodes are each connected to adjacent representative nodes. Note that as shown in FIG. 14, even in a case where each area includes a plurality of representative regions (nodes) connected to other areas, one representative node is also allowed.

The case where a plurality of representative nodes are provided in the area is, for example, a case where in a multi-story factory, elevating machines, such as elevators, reside at a plurality of sites on each story. Each story is assumed as one area, and a global travel network having representative nodes at the sites of the elevating machines in the area is generated.

Fourth Embodiment

In the first to third embodiments, the global operation schedule is generated for the global travel network, and the local operation schedule for the entire travel network is generated from the global operation schedule. That is, two-stage operation schedules that include the global operation schedule and the local operation schedule are generated. In the present embodiment, an operation schedule having three or more stages is generated.

Figure 16:
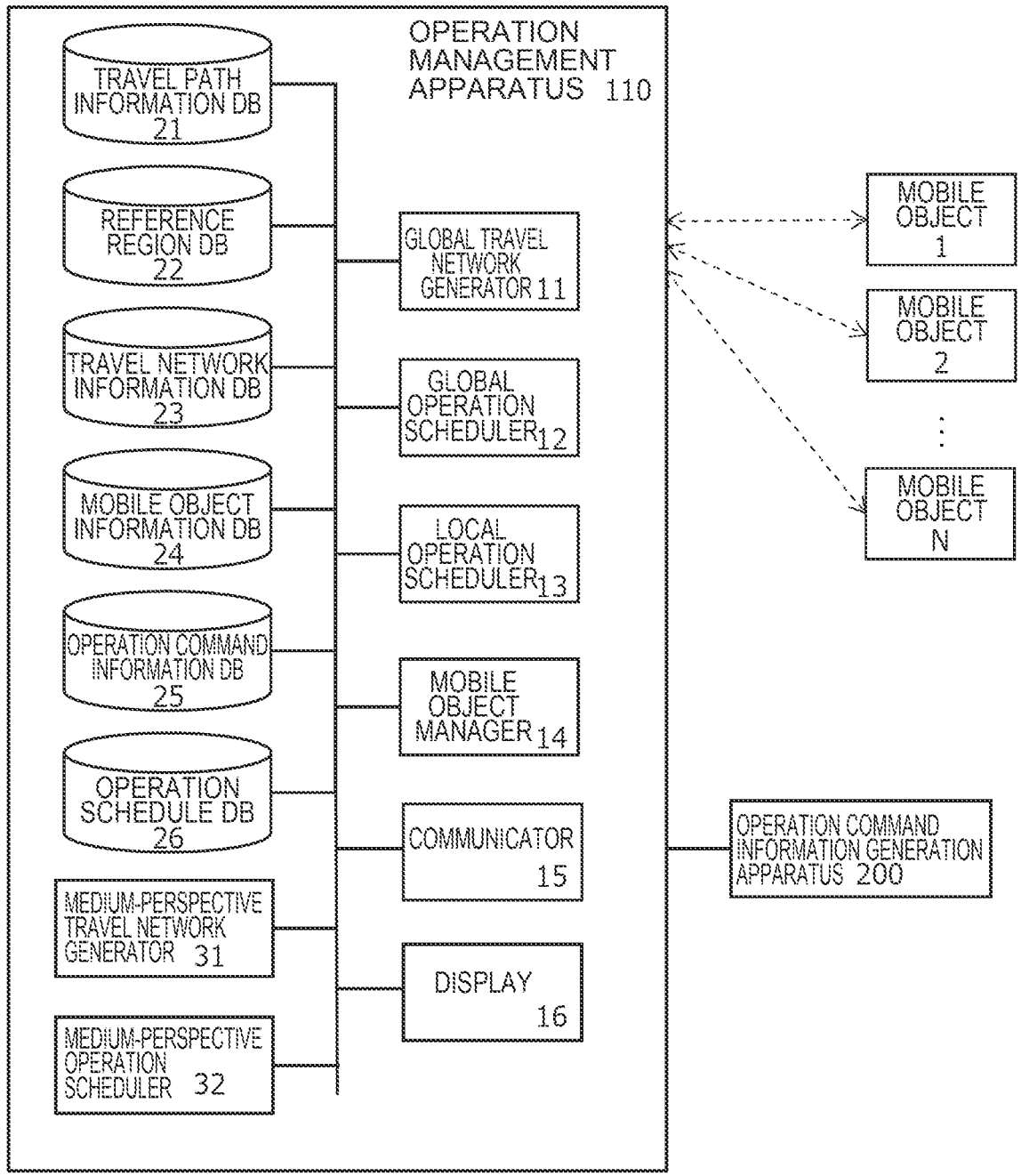
FIG. 16 is a block diagram of an operation management apparatus according to the third embodiment.

FIG. 16 is a block diagram of an operation management apparatus 110 according to the third embodiment. A medium-perspective travel network generator 31 (second virtual travel network generator), and a medium-perspective operation scheduler 32 (third scheduler) are added to the operation management apparatus 100 in FIG. 1. Accordingly, the medium-perspective travel network generator 31 generates a medium-perspective travel network (second virtual travel network) as a layer between the global travel network and the entire travel network. The medium-perspective travel network generator 31 generates the medium-perspective travel network from the entire travel network. The medium-perspective operation scheduler 32 generates a medium-perspective operation schedule for the medium-perspective travel network, based on the global operation schedule and the operation command information about the mobile objects. The local operation scheduler 13 generates a local operation schedule for the entire travel network, based on the medium-perspective operation schedule and the operation command information about the mobile objects.

FIGS. 17A to 17C show three-stage travel networks according to a fourth embodiment. FIG. 17A shows an example of the entire travel network. FIG. 17B shows an example of the medium-perspective travel network. FIG. 17C shows an example of the global travel network.

The entire travel network is divided into four areas A to D. Each area are divided into four subareas. The area A is divided into four subareas Aa, Ab, Ac and Ad. The area B is divided into four subareas Ba, Bb, Bc and Bd. The area C is divided into four subareas Ca, Cb, Cc and Cd. The area D is divided into four subareas Da, Db, Dc and Dd. In FIG. 17A, among the reference regions included in each subarea, sub-representative region (gray circle) representing the sub-area is coupled to the sub-representative regions of other subareas via travel paths. Nodes (representative regions) indicated by a reverse oblique line pattern are coupled to nodes (representative regions) of other areas via travel paths (links).

In the medium-perspective travel network in FIG. 17B, the representative subnodes (oblique-line circles) that are subnodes in the medium-perspective travel network correspond to the respective sub-representative regions. The sub-representative regions are coupled to each other via links (third links). At least one representative subnode in each area is coupled to the representative subnodes in other areas via links (fourth links). Lower subnodes (outlined circles) that are subnodes are coupled to the representative subnode via one or more links (fifth links). The medium-perspective travel network, which is a second virtual travel network, is thus generated. The mobile objects assume the links (the third links, the fourth links, and the fifth links) of the medium-perspective travel network as the virtual travel paths, on which the mobile objects can travel.

One of the representative subnodes in the four subareas in the area corresponds to the representative node (oblique-line circle) in the global travel network in FIG. 17C. For example, the representative subnode of the subarea Bd in the area B in the medium-perspective travel network corresponds to the representative node of the area B in the global travel network. One of the representative subnodes in the four subareas in the area corresponds to the representative region or the node (the circle with the reverse oblique line pattern) in the same area in the global travel network in FIG. 17A. For example, the representative subnode of the subarea Bd in the area B in the medium-perspective travel network corresponds to the representative region or the node of the area B in FIG. 17A. The representative subnodes of the subareas Ba, Bb and Bc correspond to the sub-representative regions of subareas Ba, Bb and Bc in FIG. 17A.

Similar to the first to third embodiments, also in the case of the three-stage travel networks as described above, the operation schedule can be generated stepwise. In the first embodiment, the local operation scheduler 13 generates the local operation schedule according to the travel situations of the mobile objects based on the global operation schedule and the operation command information; similar to this generation, the medium-perspective operation scheduler 32 generates the medium-perspective operation schedule according to the travel situations of the mobile objects, based on the global operation schedule and the operation command information. That is, in the medium-perspective travel network, a schedule (third schedule) that defines a route for travel of the mobile objects in the area identical to that of the representative node selected in the global operation schedule (third route), and timings of passage through the subnodes included in the third route, is generated as the medium-perspective operation schedule. The local operation scheduler 13 selects the representative subnode (first representative subnode) from among the representative subnodes defined by the medium-perspective operation schedule (third schedule), according to the travel situations of the mobile objects in the medium-perspective travel network. For the area that includes the sub-representative region corresponding to the selected representative subnode, the local operation schedule is generated. That is, in the first embodiment, the local operation schedule for travel in an area (representative region) entered by the mobile objects is generated. In the present embodiment, for the subarea (sub-representative region) entered by the mobile objects, the local operation schedule for travel in this subarea is generated.

In the present embodiment, the three-stage travel networks and the three-stage operation schedules are generated. The travel networks and the operation schedules having further multiple stages, such as four or five stages, can be generated.

According to the present embodiment, the operation schedules having the number of stages in conformity with the scale of the entire travel network can be generated, and the advantageous effects of reduction in calculation amount is improved.

Fifth Embodiment

The first to fourth embodiments assume vehicles, such as AGVs or robots, traveling on a plane, as the mobile objects. Alternatively, flight bodies traveling in a three-dimensional space, such as drones, may be assumed as the mobile objects. In this case, nodes that are space coordinates serving as travel targets are arranged in a three-dimensional space, and links connecting the nodes are arranged as travel paths, thereby allowing a graph structure of an entire flight network to be generated. Instead of the entire travel network used in the first to fourth embodiments, the entire flight network in the three-dimensional space in the present embodiment can be applied as it is. In this case, the global travel network generator 11 generates a global flight network from the entire flight network. The global operation scheduler 12 generates a global operation schedule for the global flight network. The local operation scheduler 13 generates a local operation schedule, based on the global operation schedule, according to the travel situation of flight bodies.

Figure 18A:
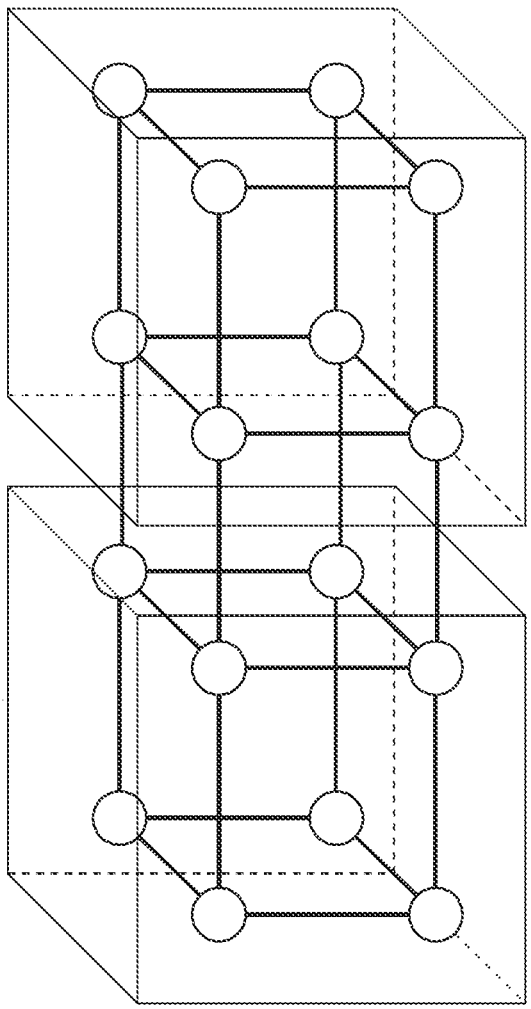
FIGS. 18A and 18B show examples of an entire flight path network, and a global flight network in a three-dimensional space.
Figure 18B:
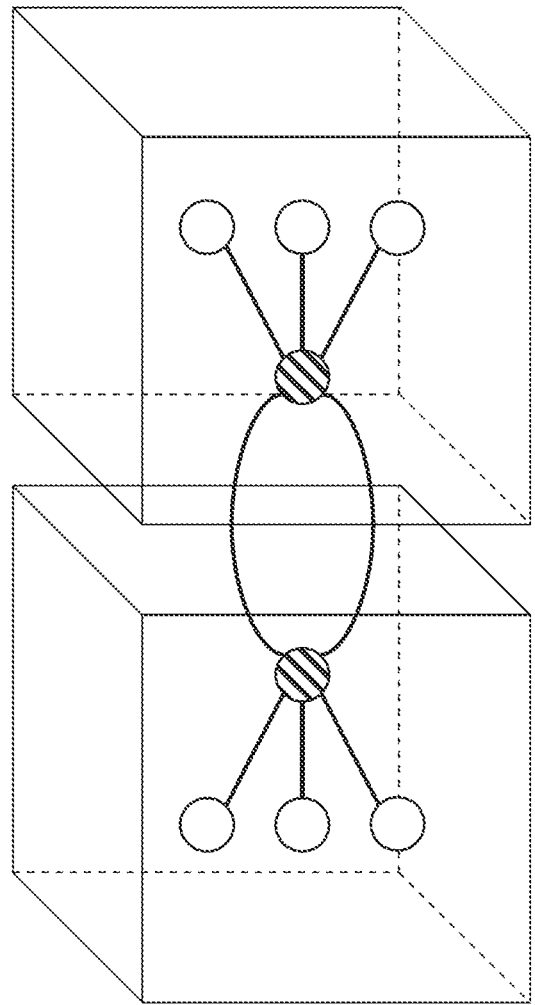

FIG. 18A shows an example of the entire flight path network in the three-dimensional space. A plurality of cuboids represent a plurality of areas obtained by dividing the entire flight path network. Circles indicate nodes representing reference regions. Straight lines between the nodes indicate links representing flight paths (travel paths). FIG. 18B shows an example of the global flight network generated from the entire flight network. In FIG. 18B, only one representative node (oblique-line circle) is set in each area. Similar to the third embodiment, a plurality of representative nodes may be set. Outlined circles in FIG. 18B indicate lower nodes.

Sixth Embodiment

In the global travel network, a plurality of mobile objects have the same departure area, and the same target area, in some cases.

FIG. 19A shows departure points (home positions), and operation command information in the entire travel network (see FIG. 4), for three bodies "agv1", "agv2" and "agv3". All of "agv1" to "agv3" are positioned at the area A as the home position. For all of "agv1" to "agv3", a point which serves as a start point and at which loading is carried out is in the area A. For all of "agv1" to "agv3", a point which serves as a target point and at which unloading is carried out is in the area D.

FIG. 19B shows the positional information (home position) about "agv1", "agv2" and "agv3" in the global travel network, and the global operation command information about "agv1", "agv2" and "agv3". All of "agv1" to "agv3" are positioned in the area A, loading is in the area A, and unloading (destination) is in the area D.

As shown in FIG. 19B, if the plurality of mobile objects have the same departure area and the same target area, and the same area for work to be carried out on the way in a case with work (loading in this example) scheduled on the way, the plurality of mobile objects are regarded as one group, and the global operation schedule is generated. That is, the plurality of mobile objects are regarded as if they are a single mobile object, and the global operation schedule is generated in the first to fifth embodiments. Accordingly, the global operation schedule allowing the plurality of mobile objects to travel as a whole is generated. For example, the global operation schedule is generated where times at which the plurality of mobile objects pass through the same representative node each slightly deviate. Accordingly, the global operation schedule allowing the plurality of mobile objects to consecutively passes through the representative region corresponding to the representative node (no other mobile objects intervene in the middle) is generated for the plurality of mobile objects. Furthermore, the departure times from the home position or the arrival times at which work is carried out may be at one time or each slightly deviate, and the arrival times at the target node may be at one time or gradually deviate. Accordingly, a schedule allowing departure in an identical time slot and arrival in an identical slot can also be achieved.

Accordingly, for example, for travel between areas, a schedule can be achieved that allows a plurality of mobile objects to form a single row and simultaneously travel with intervals to an extent avoiding collision. Accordingly, work (loading, unloading etc.) by the plurality of mobile objects can be carried out without a large temporal variation.

According to the present embodiment, a case where a plurality of mobile objects are requested to load many loads at an identical time or in an identical time slot and unload them at another node at an identical time or in an identical time slot, can be easily supported. In the present embodiment, the plurality of mobile objects are collectively assumed as one mobile object group to generate the global operation schedule, which can generate the global operation schedule with the plurality of mobile objects at a small calculation amount.

Seventh Embodiment

In the present embodiment, the display 16 displays various pieces of information about operation management, through a user interface (UI) screen for display.

Figure 20:
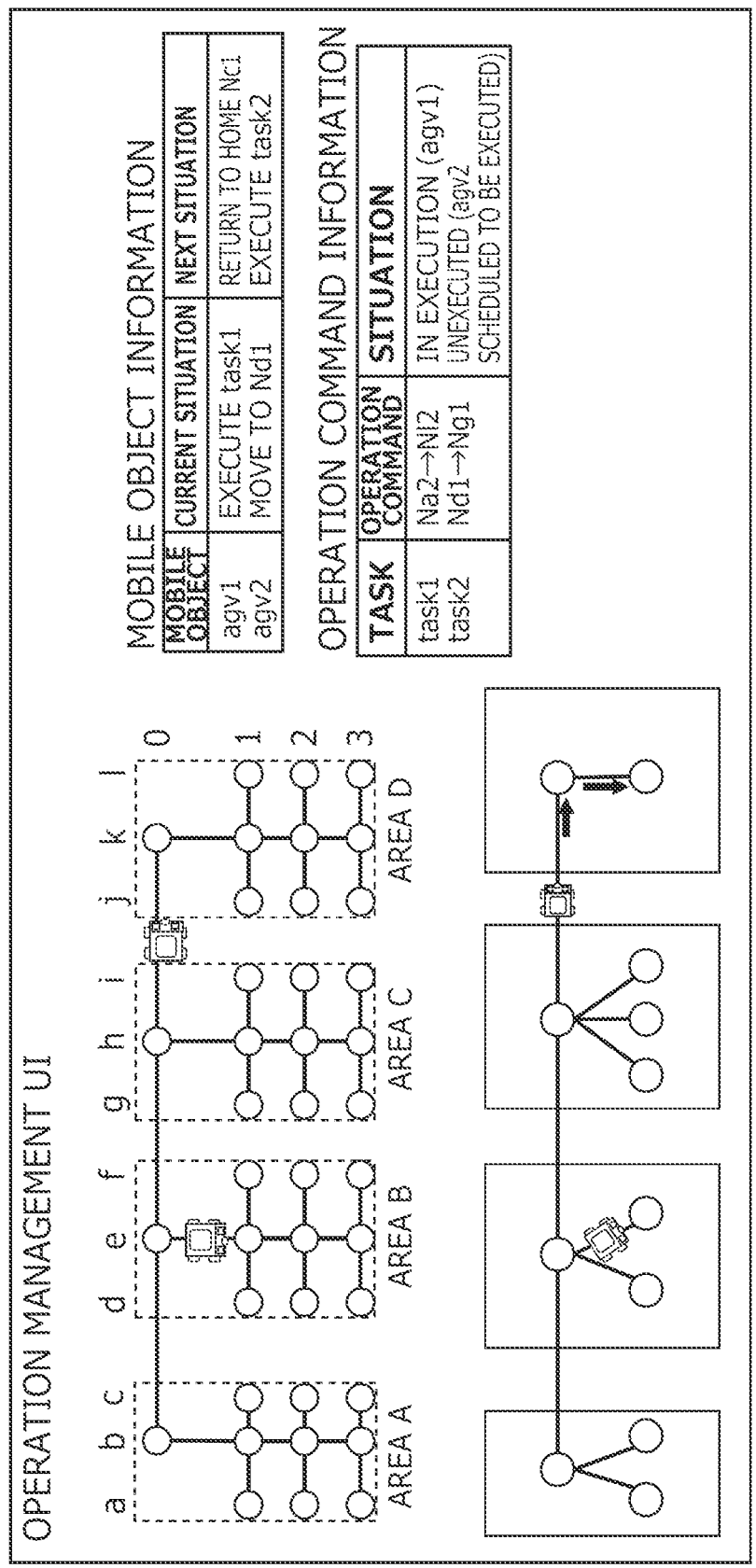
FIG. 20 shows an example of a screen of an operation management UI according to a seventh embodiment.

FIG. 20 shows an example of the screen of the operation management UI according to a seventh embodiment. The entire travel network is displayed on an upper side, and the global travel network is displayed on a lower side. The positions of the mobile objects in the entire travel network, the current situation of each mobile object, and the next situation are displayed as mobile object information. Tasks having not been executed yet, details of the tasks (operation commands), and the execution situations of operation commands are displayed as operation command information. In the entire travel network, at the positions of the mobile objects, objects representing the respective mobile objects are displayed. Also in the global travel network, at the current positions of the mobile objects, objects representing the respective mobile objects are displayed. The example in the diagram shows that "agv1" is in execution of "task1" ("current situation"), and returns to the home position Nc1 ("next situation") after completion of "task1". The diagram also shows that "agv2" is in travel to "Nd1" ("current situation"), and executes "task2" ("next situation") after travel to "Nd1". The operation command information indicates that "task1" is in execution by "agv1", "task2" has not been executed yet, and "task2" is scheduled to be executed by "agv2" (scheduled to be assigned).

Various pieces of information other than the information shown in FIG. 20 may be displayed. For example, the global operation schedule and the local operation schedule may be displayed. An update history of the global operation schedule and the local operation schedule may be displayed. Furthermore, information such as about troubles that include abnormalities and troubles of travel paths, troubles of mobile objects, delay and change of operation schedules, and troubles of loading and unloading, may be collected and displayed. The progression rates of operation schedules, the entire efficiency, differences between the schedules and actuality, the travel distances of mobile objects, travel situations of mobile objects in the global travel network, travel situations of mobile objects in the entire travel network, the travel situations of mobile objects in each area, may be displayed from the collected information. The user (e.g., the administrator, the operator, etc.) of this operation management apparatus can verify the details of the operation situations, based on the information displayed on UI.

(Hardware Configuration)

Figure 21:
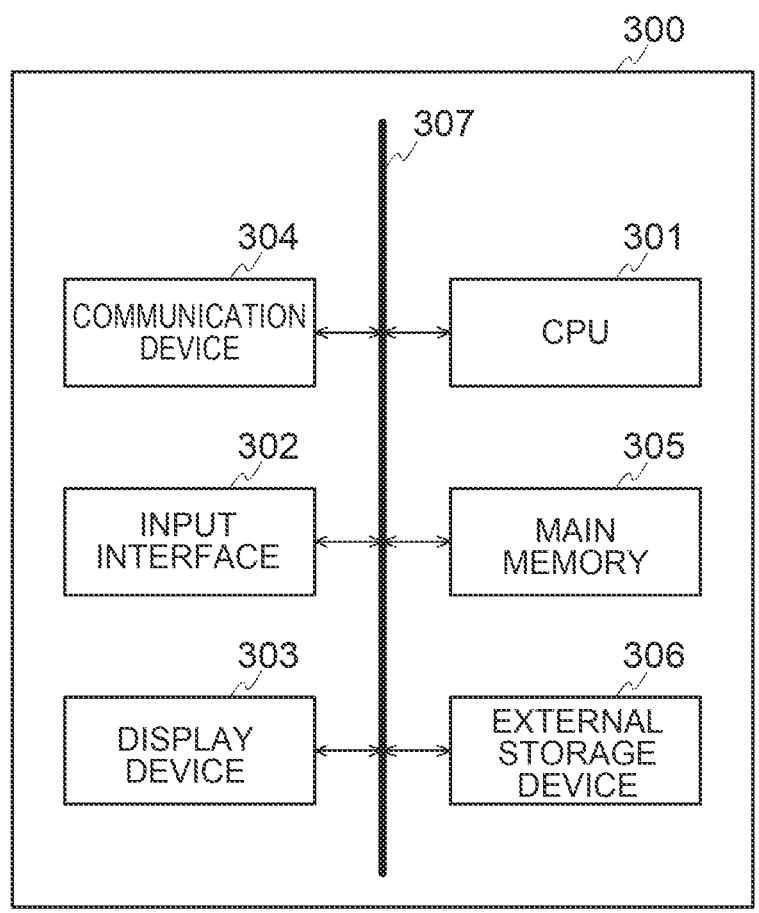
FIG. 21 shows a hardware configuration of the operation management apparatus (information processing apparatus) in FIG. 1.

FIG. 21 illustrates a hardware configuration of the operation management apparatus (information processing apparatus) 100 of FIG. 1. The information processing apparatus 100 according to the present embodiment is configured with a computer device 300. The computer device 300 includes a CPU 301, an input interface 302, a display device 303, a communication device 304, a main storage device 305 and an external storage device 306, and these are connected to each other with a bus 307.

The CPU (Central Processing Unit) 301 executes a computer program (operation management program) which realizes the above-described respective functional configurations of the information processing apparatus 100 on the main storage device 305. The computer program may not be a single program but a plurality of programs or a combination of scripts. By the CPU 301 executing the computer program, the respective functional configurations are realized.

The input interface 302 is a circuit for inputting an operation signal from the input device such as a keyboard, a mouse and a touch panel, to the information processing apparatus 100. The input function of the information processing apparatus 100 can be constructed on the input interface 302.

The display device 303 displays data or information output from the information processing apparatus 100. While the display device 303 is, for example, an LCD (Liquid Crystal Display), a CRT (Cathode-Ray Tube), and a PDP (Plasma Display Panel), the display device 303 is not limited to this. The data or the information output from the computer device 300 can be displayed by this display device 303. The output device of the information processing apparatus 100 can be constructed on the display device 303.

The communication device 304 is a circuit for the information processing apparatus 100 to communicate with an external device in a wireless or wired manner. Information can be input from the external device via the communication device 304. Information input from the external device can be stored in a DB.

The main storage device 305 stores a program (operation management program) which realizes processing of the present embodiment, data required for execution of the program, data generated by execution of the program, and the like. The program is developed and executed on the main storage device 305. While the main storage device 305 is, for example, a RAM, a DRAM and an SRAM, the main storage device 305 is not limited to this. The storage in each embodiment may be constructed on the main storage device 305.

The external storage device 306 stores the above-described program, data required for execution of the program, data generated by execution of the program, and the like. These kinds of program and data are read out to the main storage device 305 upon processing of the present embodiment. While the external storage device 306 is, for example, a hard disk, an optical disk, a flash memory and a magnetic tape, the external storage device 306 is not limited to this. The storage in each embodiment may be constructed on the external storage device 306.

Note that the above-described program may be installed in the computer device 300 in advance or may be stored in a storage medium such as a CD-ROM. Further, the program may be uploaded on the Internet.

Note that the computer device 300 may include one or a plurality of the processors 301, the input interfaces 302, the display devices 303, the communication devices 304 and the main storage devices 305, or peripheral equipment such as a printer and a scanner may be connected to the computer device 300.

Further, the information processing apparatus 100 may be configured with a single computer device 300 or may be configured as a system including a plurality of computer devices 300 which are connected to each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
processing circuitry configured to:
read, from a database, structure information on a travel network including a plurality of travel paths and a plurality of reference regions connecting the plurality of travel paths, the structure information of the travel network including graph data which includes nodes corresponding to the reference regions and links corresponding to the travel paths,
divide the travel network into a plurality of areas each containing two or more of the reference regions based on the structure information,
determine a representative region in each area, representative regions in adjacent areas being connected to each other via the travel path,
divide each of the areas into a plurality of subareas, a sub-representative region among the reference regions included in each of the subareas being connected to a sub-representative region of other subarea via the travel path, the representative region corresponding to the sub representative region of the sub-area containing the representative region;
generate a first virtual travel network including representative subnodes corresponding to the sub-representative regions and first links connecting between representative subnodes of sub-representative regions in each area and between representative subnodes of sub-representative regions in different areas;
acquire move command information that instructs the mobile object to travel from a first reference region to a second reference region, specify a first sub-area including the first reference region and a second sub-area including the second reference regions, and generate virtual move command information which instructs the mobile object to travel from a sub-representative region of the first sub-area to a sub-representative region of the second sub-area on the first virtual travel network;
generate a second schedule on the first virtual travel network, which includes sub-representative regions of passing through for moving from the sub-representative region of the first sub-area to the sub-representative region of the second sub-area and includes times of passing through the sub-representative regions, based on the virtual move command information;
generate a first schedule on the travel network, which includes reference regions of passing through for moving from the first reference region of the first sub-area to the sub-representative region of the first sub-area and includes times of passing through the reference regions, based on the second schedule and the move command information; and
control circuitry configured to control the mobile object to move from the first reference region to the sub-representative region of the first sub-area based on the first schedule and after detecting that the mobile object arrives at the sub-representative region of the first sub-area, control the mobile object to move from the sub-representative area region of the first sub-area to the sub-representative region of the second sub-area based on the second schedule,
wherein:
the processing circuitry identifies the second sub-area as a subarea that includes the reference area specified by the move command information according to an execution status of the second schedule, and based on the second schedule, generates a third schedule which includes reference regions of passing through for moving from the sub-representative region of the second sub-area to the second reference region in the second sub-area and includes times of passing through the reference regions,
the control circuitry controls the mobile object to move from the sub-representative region of the second sub-area to the second reference region based on the third schedule after detecting that the mobile object arrives at the sub-representative region of the second sub-area, and the processing circuit updates the second schedule according to an execution status of the first schedule or updates the third schedule according to an execution status of the second schedule.

2. The information processing apparatus according to claim 1, wherein:

the move command information instructs the mobile object to travel from the first reference region in a first area to the second reference region in a second area, and the processing circuitry is further configured to:
generate a second virtual mobile network which includes representative nodes each representing a representative region of each area and fourth links connecting the representative nodes,
generate second virtual move command information to travel from a representative region of the first area to a representative region of the second area on the second virtual travel network, based on the movement command information;
generate a global operation schedule based on the second virtual move command information that includes representative regions of passing through for moving from the representative region in the first area to the representative region in the second area, and includes times of passing through the representative regions; and
generate a second local operation schedule that includes reference regions of passing through for moving from the first reference region of the first area to the representative region of the first area and includes times of passing through the reference regions based on the global operation schedule, and wherein the processing circuitry further identifies the second area as an area that includes the reference area specified by the move command information according to an execution status of the global operation schedule, and based on the global operation schedule, generates a third local operation schedule which includes reference regions of passing through for moving from the representative region of the second area to the second reference region in the second area and includes times of passing through the reference regions, and the control circuitry further controls the mobile object to move from the representative region of the second area to the second reference region based on the third local operation schedule after detecting that the mobile object arrives at the representative region of the second area.

3. The information processing apparatus according to claim 2, wherein the control circuitry generates move command data based on the global operation schedule, the second local operation schedule, and the third local operation schedule, and transmits the movement command data to the first mobile object.

4. The information processing apparatus according to claim 3, wherein the plurality of reference regions are three-dimensionally arranged.

5. The information processing apparatus according to claim 3, wherein the mobile object is a vehicle.

6. The information processing apparatus according to claim 3, wherein the mobile object is a flight body.

7. A travel management system, comprising:
the information processing apparatus according to claim 3; and
the mobile object.

8. The information processing apparatus according to claim 3, further comprising
an input circuit to receive instructions from a person in charge of operation management,
wherein the processing circuitry divides the travel network into the plurality of areas according to the instructions from the input circuit, and stores information of the divided areas in the database.

9. The information processing apparatus according to claim 2, wherein the processing circuitry is configured to detect a position of the mobile object via communication circuitry or via a sensor arranged in the travel network; and generate the third local operation schedule at timing of moving from one previous representative region to the representative region in the second area.

10. The information processing apparatus according to claim 9, wherein the control circuitry generates move command data based on the global operation schedule, the second local operation schedule, and the third local operation schedule, and transmits the movement command data to the first mobile object.

11. The information processing apparatus according to claim 2, wherein:
the processing circuitry generates the third local operation schedule at timing when the processing circuitry detects that the mobile object moves from one previous representative region to the representative region of the second area.

12. The information processing apparatus according to claim 11, wherein
the processing circuitry is further configured to:
set lower nodes via one or more fifth links to each representative node in the second virtual mobile network, the lower nodes being able to be assigned each only one mobile object,
assign the mobile object in the first area to any one of the lower nodes of the representative node of the first area, the assigned lower node corresponding to a location of the mobile object in the travel network, and generate the second local operation schedule to move from the assigned lower node to the representative region of the first area, and de-allocate the mobile object when the mobile object moves out of the first area due to an execution of the second local operation schedule, and
wait to assign the mobile object to the lower node when other mobile objects are already assigned to all of the lower nodes until the lower node becomes available, and assign the mobile object to the lower node when the lower node becomes available.

13. The information processing apparatus according to claim 11, wherein the processing circuitry is capable of changing a number of the lower nodes connected to at least one of the representative nodes in accordance a received instruction.

14. The information processing apparatus according to claim 2, wherein when the processing circuitry detects that a command to move to a third reference region other than the representative region within a third area between the first area and the second area has been added to the movement command information after the mobile object has departed from the first reference region, the processing circuitry generates a fourth local operation schedule that includes reference regions of passing through for round trip between the representative region of the third area and the third reference region and times of passing through the reference regions, based on the global operation schedule before the mobile object arrives at the representative region of the third area.

15. The information processing apparatus according to claim 2, wherein when the move command information for a second mobile object to a K-th mobile object ("K" is an integer of two or more) which is different from a first mobile object being the mobile object is an instruction of travel from any reference region in the area identical to that of the first reference region to any reference region in the area identical to that of the second reference region, the processing circuitry is configured to generate the global operation schedule allowing a sequence of the first mobile object to the K-th mobile object to consecutively pass through each of the representative regions included in the global operation schedule for the first mobile object to the K-th mobile object.

16. An information processing method comprising:
 reading, from a database, structure information on a travel network including a plurality of travel paths and a plurality of reference regions connecting the plurality of paths, the structure information of the travel network including graph data which includes nodes corresponding to the reference regions and links corresponding to the travel paths;
 dividing the travel network into a plurality of areas each containing two or more of the reference regions based on the structure information;
 determining a representative region in each area, representative regions in adjacent areas being connected to each other via the travel path;
 dividing each of the areas into a plurality of subareas, a sub-representative region among the reference regions included in each of the subareas being connected to a sub-representative region of other subarea via the travel path, the representative region corresponding to the sub representative region of the sub-area containing the representative region;
 generating a first virtual travel network including representative subnodes corresponding to the sub-representative regions and first links connecting between representative subnodes of sub-representative regions in each area and between representative subnodes of sub-representative regions in different areas;
 acquiring move command information that instructs the mobile object to travel from a first reference region to a second reference region, specify a first sub-area including the first reference region and a second sub-area including the second reference regions, and generate virtual move command information which instructs to travel from a sub-representative region of the first sub-area to a sub-representative region of the second sub-area on the first virtual travel network;
 generating a second schedule on the first virtual travel network, which includes sub-representative regions of passing through for moving from the sub-representative of the first sub-area to the sub-representative region of the second sub-area and includes times of passing through the sub-representative regions, based on the virtual move command information;
 generating a first schedule on the travel network, which includes reference regions of passing through for moving from the first reference region of the first subarea to the sub-representative region of the first sub-area and includes times of passing through the reference regions, based on the second schedule and the move command information;
 controlling the mobile object to move from the first reference region to the subrepresentative region of the first sub-area based on the first schedule and after detecting that the mobile object arrives at the sub-representative region of the first subarea, control the mobile object to move from the sub-representative region of the first subarea to the sub-representative region of the second sub-area based on the second schedule;
 identifying the second sub-area as a sub-area that includes the reference area specified by the move command information according to an execution status of the second schedule, and based on the second schedule, generates a third schedule which includes reference regions of passing through for moving from the sub-representative region of the second sub-area to the second reference region in the second sub-area and includes times of passing through the reference regions;
 controlling the mobile object to move from the sub-representative region of the second sub-area to the second reference region based on the third schedule after detecting that the mobile object arrives at the sub-representative region of the second sub-area; and
 updating the second schedule according to an execution status of the first schedule or updates the third schedule according to an execution status of the second schedule.

17. A non-transitory computer readable medium having a computer program stored in the medium and causing, when executed by a computer, the computer to perform processes comprising:
 reading, from a database, structure information on a travel network including a plurality of travel paths and a plurality of reference regions connecting the plurality of paths, the structure information of the travel network including graph data which includes nodes corresponding to the reference regions and links corresponding to the travel paths;
 dividing the travel network into a plurality of areas each containing two or more of the reference regions based on the structure information;
 determining a representative region in each area, representative regions in adjacent areas being connected to each other via the travel path;
 dividing each of the areas into a plurality of subareas, a sub-representative region among the reference regions included in each of the subareas being connected to a sub-representative region of other subarea via the travel path, the representative region corresponding to the sub representative region of the sub-area containing the representative region;
 generating a first virtual travel network including representative subnodes corresponding to the sub-representative regions and first links connecting between representative subnodes of sub-representative regions in each area and between representative subnodes of sub-representative regions in different areas;
 acquiring move command information that instructs the mobile object to travel from a first reference region to a second reference region, specify a first sub-area including the first reference region and a second sub-area including the second reference regions, and generate virtual move command information which instructs to travel from a sub-representative region of the first sub-area to a sub-representative region of the second sub-area on the first virtual travel network;

generating a second schedule on the first virtual travel network, which includes sub-representative regions of passing through for moving from the sub-representative of the first sub-area to the sub-representative region of the second sub-area and includes times of passing through the sub-representative regions, based on the virtual move command information;

generating a first schedule on the travel network, which includes reference regions of passing through for moving from the first reference region of the first subarea to the sub-representative region of the first sub-area and includes times of passing through the reference regions, based on the second schedule and the move command information;

controlling the mobile object to move from the first reference region to the subrepresentative region of the first sub-area based on the first schedule and after detecting that the mobile object arrives at the sub-representative region of the first subarea, control the mobile object to move from the sub-representative region of the first subarea to the sub-representative region of the second sub-area based on the second schedule;

identifying the second sub-area as a sub-area that includes the reference area specified by the move command information according to an execution status of the second schedule, and based on the second schedule, generates a third schedule which includes reference regions of passing through for moving from the sub-representative region of the second sub-area to the second reference region in the second sub-area and includes times of passing through the reference regions;

controlling the mobile object to move from the sub-representative region of the second sub-area to the second reference region based on the third schedule after detecting that the mobile object arrives at the sub-representative region of the second sub-area; and updating the second schedule according to an execution status of the first schedule or updates the third schedule according to an execution status of the second schedule.

* * * * *